(12) United States Patent
Yu et al.

(10) Patent No.: US 9,961,257 B2
(45) Date of Patent: May 1, 2018

(54) IMAGING TO FACILITATE OBJECT GAZE

(71) Applicant: BEIJING ZHIGU RUI TUO TECH CO., LTD., Beijing (CN)

(72) Inventors: Kuifei Yu, Beijing (CN); Lin Du, Beijing (CN); Wei Shi, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days. days.

(21) Appl. No.: 14/904,936

(22) PCT Filed: Jul. 2, 2014

(86) PCT No.: PCT/CN2014/081483
§ 371 (c)(1),
(2) Date: Jan. 13, 2016

(87) PCT Pub. No.: WO2015/043273
PCT Pub. Date: Apr. 2, 2015

(65) Prior Publication Data
US 2016/0150154 A1 May 26, 2016

(30) Foreign Application Priority Data

Sep. 30, 2013 (CN) .......................... 2013 1 0462232

(51) Int. Cl.
H04N 5/232 (2006.01)
G02B 27/01 (2006.01)
G06K 9/00 (2006.01)

(52) U.S. Cl.
CPC ....... *H04N 5/23219* (2013.01); *G02B 27/017* (2013.01); *G02B 27/0172* (2013.01);
(Continued)

(58) Field of Classification Search
CPC .... G02B 2027/0127; G02B 2027/0138; G02B 2027/014; G02B 2027/0147;
(Continued)

(56) References Cited

U.S. PATENT DOCUMENTS 8,441,435 B2 * 5/2013 Kondo ............... G02B 27/0093
345/156
8,885,882 B1 * 11/2014 Yin .......................... G06F 3/00
382/103
(Continued)

FOREIGN PATENT DOCUMENTS

CN 101141567 A 3/2008
CN 101165538 A 4/2008
(Continued)

OTHER PUBLICATIONS

Office Action for CN App. No. 201310462232.4, dated Jun. 11, 2014, 7 pages.
(Continued)

*Primary Examiner* — Amy Hsu

(57) ABSTRACT

An imaging method includes determining a gazed object of a user according to an image at the user's eye fundus; and changing a size of a target image of the gazed object according to a predetermined zooming rule. A device comprises: an object determination unit configured to determine a gazed object of a user according to an image at the user's eye fundus; and a processing unit configured to change a size of a target image of the gazed object according to a predetermined zooming rule. The size of the target image can be changed by optical zoom processing, so that the user feels that the gazed object is observed with an appropriate size of the image at the eye fundus at an appropriate distance, thereby facilitating the user to observe the gazed object and improving the observation efficiency.

32 Claims, 18 Drawing Sheets

(52) U.S. Cl.
CPC ....... *G02B 27/0179* (2013.01); *G06K 9/0061* (2013.01); *G06K 9/00604* (2013.01); *H04N 5/23212* (2013.01); *H04N 5/23296* (2013.01); *G02B 2027/014* (2013.01); *G02B 2027/0127* (2013.01); *G02B 2027/0138* (2013.01); *G02B 2027/0147* (2013.01); *G02B 2027/0178* (2013.01); *G02B 2027/0187* (2013.01)

(58) Field of Classification Search
CPC .... G02B 2027/0178; G02B 2027/0187; G02B 27/0172; G02B 27/0179; G06K 9/00604; H04N 5/23212; H04N 5/23219; H04N 5/23296
See application file for complete search history.

(56) References Cited

U.S. PATENT DOCUMENTS

| | | | | |
|---|---|---|---|---|
| 8,957,847 | B1* | 2/2015 | Karakotsios | G06F 3/013 345/156 |
| 2002/0113943 | A1* | 8/2002 | Trajkovic | G06K 9/00604 351/209 |
| 2008/0062291 | A1* | 3/2008 | Sako | G02B 27/0093 348/294 |
| 2013/0127980 | A1* | 5/2013 | Haddick | G06F 3/013 348/14.08 |
| 2013/0258089 | A1* | 10/2013 | Lyons | H04N 5/23212 348/77 |
| 2013/0261612 | A1* | 10/2013 | Yokosuka | A61B 3/10 606/4 |
| 2013/0278631 | A1* | 10/2013 | Border | G02B 27/017 345/633 |
| 2014/0313374 | A1* | 10/2014 | Cao | H04N 5/23212 348/240.1 |
| 2015/0187070 | A1* | 7/2015 | Cheng | G06T 7/11 382/128 |
| 2016/0150154 | A1* | 5/2016 | Yu | G02B 27/017 348/78 |

FOREIGN PATENT DOCUMENTS

| | | |
|---|---|---|
| CN | 101943982 A | 1/2011 |
| CN | 102445756 A | 5/2012 |
| CN | 102592569 A | 7/2012 |
| CN | 103190883 A | 7/2013 |
| CN | 103499885 A | 1/2014 |
| CN | 103499886 A | 1/2014 |
| EP | 2382913 A1 | 11/2011 |

OTHER PUBLICATIONS

Office Action for CN App. No. 201310462232.4, dated Jul. 30, 2014, 30 pages.
PCT International Search Report and Written Opinion dated Oct. 10, 2014, issued in corresponding International Application No. PCT/CN2014/081483 (9 pages).

* cited by examiner

ID OF 9,961,257 B2

IMAGING TO FACILITATE OBJECT GAZE

CROSS-REFERENCE TO RELATED APPLICATION

The present application is a national stage application of International Application No. PCT/CN2014/081483, filed on Jul. 2, 2014, which claims priority to and benefits of Chinese Patent Application No. 201310462232.4, filed on Sep. 30, 2013, and titled "Image device and method,". The contents of both of the above-referenced applications are incorporated herein by reference in their entirety.

TECHNICAL FIELD

The present application relates to the technical field of imaging, and in particular, to imaging to facilitate gazing at object(s).

BACKGROUND

For a user with healthy eyes, when viewing a relatively small or relatively far object, it is hard to observe desired details by the eyes. For example, when people sit at a relatively far position watching a ball game, it is hard to observe the details of body motion and emotional expression of a player. For a user whose eyes already have problems of myopia or hypermetropia, when viewing a relatively small or relatively far object, it is harder to identify the details of an observed object or person by the eyes. On the other hand, when viewing a relatively large or relatively near object, it is hard to observe the panorama information of the gazed object. For example, when a user stands in front of a high building or a big mountain, it is hard to observe their panorama.

Conventional optical zooming devices, such as a telescope or a magnifier, rely on manual setting of zooming parameters, and are not convenient for use.

SUMMARY

The following presents a simplified summary in order to provide a basic understanding of some example embodiments disclosed herein. This summary is not an extensive overview. It is intended to neither identify key or critical elements nor delineate the scope of the example embodiments disclosed. Its sole purpose is to present some concepts in a simplified form as a prelude to the more detailed description that is presented later.

An example purpose of at least one embodiment of the present application is to provide an imaging device and method, so as to facilitate a user in observing a gazed object.

According to one example embodiment of the present application, provided is a method, the method including:

determining, by a system comprising a processor, a gazed object of a user according to an image at an eye fundus of the user; and changing a size of a target image of the gazed object at the eye fundus according to a predetermined zooming rule.

According to another example embodiment of the present application, provided is an imaging device, comprising:

a processor that executes or facilitates execution of executable units to perform operations of the imaging device, the executable units comprising:

an object determination unit configured to determine a gazed object of a user according to an image at an eye fundus of the user; and a processing unit configured to change a size of a target image of the gazed object at the eye fundus according to a predetermined zooming rule.

According to another example embodiment of the present application, provided is a computer readable storage device, comprising at least one executable instruction, which, in response to execution, causes an imaging device comprising a processor to perform operations, comprising:

determining a gazed object of a user according to an image at an eye fundus of the user; and changing a size of a target image of the gazed object at the eye fundus according to a predefined zooming rule.

According to another example embodiment of the present application, provided is an imaging device comprising a processor and a memory, the memory storing computer executable instructions, the processor being connected to the memory through a communication bus, and when the imaging device operates, the processor executing the computer executable instructions stored in the memory, so that the imaging device executes operations, comprising:

determining a gazed object of a user according to an image at an eye fundus of the user; and changing a size of a target image of the gazed object at the eye fundus according to a defined zooming rule.

In the imaging device and method of at least one embodiment of the present application, a gazed object of a user is determined according to an image at the user's eye fundus, and the size of the target image of the gazed object at the user's eye fundus is automatically changed through optical zoom processing, according to the size of the target image of the gazed object at the user's eye fundus, or according to an observation distance from the gazed object to an eye of the user, so that the user feels that the gazed object is observed with an appropriate size of the image at the eye fundus at an appropriate distance, thereby facilitating the observation of a gazed object and improving the observation efficiency.

DETAILED DESCRIPTION

Embodiments of the present application will be further illustrated in detail in conjunction with the appended drawings and embodiments. The following embodiments are used to illustrate the present application, but not used to limit the scope of the present application.

When a physical body is relatively small or a physical body is relatively far from an eye of a user, the image of the physical body at the user's eye fundus will be relatively small, therefore the user would desire to bring the physical body nearer for viewing; and when a physical body is relatively large or relatively near, a user is hard to observe the panorama information thereof, therefore the user would desire to put the physical body further away for viewing. Therefore, at least one embodiment of the present application provides an imaging method, which automatically changes the size of the target image of a physical body at the eye fundus of a user by optical zoom processing, to facilitate the user in viewing a gazed object.

Figure 1:
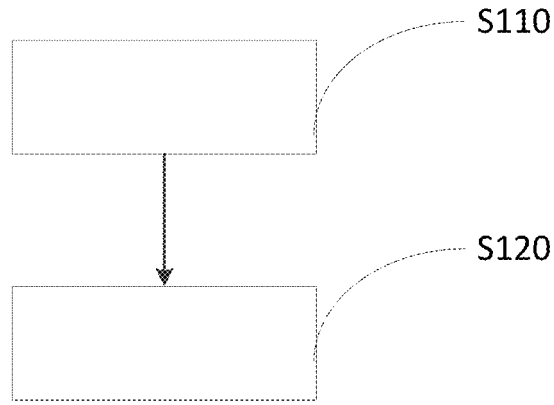
FIG. 1 is an example flow diagram of the imaging method in the embodiments of the present application.

As shown in FIG. 1, the method includes:

S110: determining a gazed object of a user according to an image at the user's eye fundus.

The center of the retina at the eye fundus of human is a macular area, which is located at the optical central region of a human eye, and is a projection point of an eye sight axis. A depression at the center of a macula lutea is called fovea centralis, which is the most acute place of eye sight, and the gazed object of an eye is projected to the fovea centralis of the macular area. Hence, the gazed object of a user can be determined by collecting an image corresponding to the fovea centralis of the macular area in an image at the eye fundus. The gazed object generally refers to a physical body, person, etc., which the user has observed for a time period exceeding a predetermined time.

S120: changing a size of a target image of the gazed object at the user's eye fundus according to a predetermined zooming rule.

In this step, the changing the size of the target image of the gazed object at the user's eye fundus is realized mainly by optical zoom processing. The changing the size of the target image of the gazed object at the user's eye fundus can be optically zooming-in the target image of the gazed object at the user's eye fundus, or can also be optically zooming-out the target image of the gazed object at the user's eye fundus. Various situations for the predetermined zooming rule may be present, for example, the size of the target image of the gazed object at the user's eye fundus can be changed according to the actual area ratio of the target image at the user's eye fundus, and the size of the target image of the gazed object at the user's eye fundus can also be changed according to the distance from the gazed object to an eye. The setting of the predetermined zooming rule should aim at the following goal: the area ratio of the target image with a changed size at the user's eye fundus allows the user to feel that it is relatively comfortable to observe the gazed object.

The method of this embodiment determines a gazed object of a user according to an image at the user's eye fundus, and changes the size of the target image of the gazed object at the user's eye fundus according to a predetermined zooming rule, so that the user feels that the gazed object is observed with an appropriate size of the image at the eye fundus at an appropriate distance, thereby facilitating a user to observe a gazed object.

In addition, in order to avoid the occurrence of the case where under a non-gazing state of the user, for example, in a process of an arbitrary glancing, an image at the eye fundus of a user is changed, influencing the user experience, the step S120 can be:

S120': in the case where the user has observed the gazed object for a time period exceeding a predetermined time, changing the size of the target image of the gazed object at the user's eye fundus according to a predetermined zooming rule.

The setting of the predetermined time should aim at the goal that a currently observed object gazed by a user is just determined; generally, the shortest observation time is 0.07-0.3 s for the human eye to view a target to obtain an visual impression, and the predetermined time should be greater than the shortest observation time, for example, can be set to 1 s, 2 s, etc. In addition, the time for a user to observe the gazed object can be acquired by monitoring the residence time of an image corresponding to the fovea centralis of the macula lutea, and in the case where the residence time of an image of one and the same object corresponding to the fovea centralis exceeds the predetermined time, it can be judged that the user is currently gazing the object.

The method is illustrated by implementations according to the various situations of the predetermined zooming rule:

in the first implementation of the method in this embodiment, the method also includes:

S130a: presetting a target area ratio of the target image, and a buffer zone of the target area ratio.

The step S120 includes:

S121a: calculating the actual area ratio of the target image at the user's eye fundus.

S122a: changing the size of the target image according to the target area ratio, the actual area ratio, and the buffer zone.

Particularly, in the step S130a, the target area ratio is a desired area ratio of the target image at the eye fundus of a user, and for example, can be 50%. In the case where the area ratio of the target image at the eye fundus of a user is the target area ratio, the user will feel that the gazed object is at an appropriate distant from himself/herself, and the target image will not be too large or too small. In addition, the area ratio of the target image which allows a user to feel comfortable generally is not an area ratio point, but is more likely to be an area ratio range, and therefore, a buffer zone of the target area ratio is also set in the step S130a. Generally, the buffer zone is a predetermined area ratio range on the two sides of the target area ratio. For example, by assuming the target area ratio to be $S_T$, the buffer zone can be $((S_T-S_L, S_T) \cup (S_T, S_T+S_R))$, where $S_T$, $S_L$ and $S_R$ are constants. Thus, the area ratio region $(S_T-S_L, S_T+S_R)$ is set to be the area ratio region which makes the user feel comfortable. $S_L$ can be equal to $S_R$, and in this case, the first sub-buffer zone $(S_T-S_L, S_T)$ and second sub-buffer zone $(S_T, S_T+S_R)$ of the buffer zone have the same size, with $S_T$ as the center thereof; and $S_L$ may also be not equal to $S_R$, and in this case, the first sub-buffer zone $(S_T-S_L, S_T)$ and second sub-buffer zone $(S_T, S_T+S_R)$ have different sizes.

In the step S121a, the area of the eye fundus of the user is generally a fixed value, and the actual area ratio of the target image at the user's eye fundus can be obtained by acquiring the area of the target image.

The step S122a includes:

in the case where the actual area ratio is smaller than the target area ratio and the actual area ratio is outside the buffer zone, zooming-in the target image to the target area ratio; and in the case where the actual area ratio is greater than the target area ratio and the actual area ratio is outside the buffer zone, zooming-out the target image to the target area ratio.

In some implementations requiring simple control, the buffer zone can also be set to zero, that is, the buffer zone is not present, in this case, the step S122a includes:

in the case where the actual area ratio is smaller than the target area ratio, zooming-in the target image to the target area ratio; and in the case where the actual area ratio is greater than the target area ratio, zooming-out the target image to the target area ratio.

It can be seen that the method can zoom-in the image of a relatively far relatively small gazed object at the eye fundus of a user, and can also zoom-out the image of a relatively near relatively large gazed object at the user's eye fundus, to alleviate visual fatigue of the user under different use scenes.

In the second implementation of the method in this embodiment, the step S120 includes:

S121b: calculating the actual area ratio of the target image at the user's eye fundus;

S122b: determining a corresponding zooming-in factor according to the actual area ratio; and S123b: changing the size of the target image according to the zooming-in factor.

Particularly, in the step S122b, the mode of calculating the actual area ratio of the target image at the user's eye fundus can be similar to the previous implementation, and is not described here redundantly.

In the step S122b, there can be various implementations configured to determining the corresponding zooming-in factor according to the actual area ratio, for example, the corresponding zooming-in factor is determined according to a piecewise function corresponding to the actual area ratio, or by looking up in a table.

This implementation selects a relatively quick way of looking up in a table, that is, a corresponding relationship table between actual area ratios and zooming-in factors is preset, and then, in the execution process of the method, the currently desired zooming-in factor is determined by looking up in the table. The zooming-in factor can be 1, can be a constant greater than 1, and can also be a fraction greater than 0 and smaller than 1. The following table 1 is an example of a zooming-in factor table; it can be seen that corresponding to each actual area ratio $S_{RE}$, a preset zooming-in factor $T_1$ is stored in the table 1, for example, when the actual area ratio $S_{RE}$ is 20%, the corresponding zooming-in factor can be determined to be 2 by looking up in the table.

TABLE 1 first zooming-in factor table

| actual area ratio $S_{RE}$ | zooming-in factor $T_1$ |
|---|---|
| $0 < S_{RE} \leq 5\%$ | 15 |
| $5\% < S_{RE} \leq 10\%$ | 6 |
| $10\% < S_{RE} \leq 30\%$ | 2 |
| $30\% < S_{RE} \leq 70\%$ | 1 |
| $70\% < S_{RE} \leq 90\%$ | ⅔ |
| $90\% < S_{RE} \leq 100\%$ | ½ |

In the step S123b, the image of the gazed object at the user's eye fundus is generally zoomed-in by the zooming-in factor determined in step S122b by means of adjusting the focal length of an optical lens. For example, when the actual area ratio $S_{RE}$ (i.e., the initial area ratio of the image of the gazed object at the user's eye fundus) of the target image is 20%, and the zooming-in factor determined in step S122b is 2, the area ratio of the new image of the gazed object at the user's eye fundus will be 40% after the optical zoom processing of step S123b; when the actual area ratio $S_{RE}$ of the target image is 50%, and the zooming-in factor determined in step S122b is 1, step S123b does not perform the optical zoom processing, and the area ratio of the image of the gazed object at the user's eye fundus is not changed; and when the actual area ratio $S_{RE}$ of the target image is 98%, and the zooming-in factor determined in step S122b is ½, after the optical zoom processing of step S123b, the area ratio of new image of the gazed object at the user's eye fundus will be 49%.

It can be seen that after the above-mentioned zoom processing, an excessively small or large actual area ratio of the target image of the gazed object at the user's eye fundus will be adjusted to an appropriate ratio, so as to facilitate the user in viewing the gazed object. In addition, in above steps S122b and S123b, it can also be set that the zoom processing is performed only in the case where the actual area ratio of the target image is too small (for example, smaller than 30%), or it can also be set that the zoom processing is performed only in the case where the actual area ratio of the target image is too large (for example, greater than 70%).

In the third implementation of the method in this embodiment, the step S120 includes:

S121c: acquiring an observation distance from the gazed object to an eye of the user;

S122c: determining a corresponding zooming-in factor according to the observation distance; and S123c: changing the size of the target image according to the zooming-in factor.

Particularly, the step S121c can detect the actual focusing point distance of the eye of the user, and take the actual focusing point distance as the observation distance from the gazed object to the eye of the user.

Detecting the actual focusing point distance of the eye of the user includes:

S210: collecting images presented at the user's eye fundus.

The image presented at the eye fundus herein mainly is an image presented on the retina, which can be an image of the eye fundus itself, or can also be an image of another physical body projected to the eye fundus.

S220: adjusting the imaging parameters of the optical path between the eye and the image collection position, so as to collect images with a definition greater than a predetermined value.

S230: processing the images collected to obtain optical parameters of the eye corresponding to the images with a definition greater than the predetermined value.

The step S230 can include:

S231: analyzing the collected images to find the images with a definition greater than the predetermined value; and S232: calculating optical parameters of the eye, according to the images with a definition greater than the predetermined value and the known imaging parameters of the optical path corresponding to the images with a definition greater than the predetermined value.

In order to improve the precision, the step S230 can select the image with the highest definition from the images with a definition greater than the predetermined value, and calculate the optical parameters of the eye according to the image with the highest definition.

S240: obtaining the actual focusing point distance of the eye according to the optical parameters of the eye.

In addition, the step S121c can also acquire the observation distance from the gazed object to the eye of the user by the following means:

tracking the direction of line-of-sight of the eye of the user, acquiring the scene depth of the position where the gazed object is located according to the direction of line-of-sight, and calculating the observation distance from the gazed object to the eye of the user according to the scene depth; Alternatively, tracking the directions of line-of-sight of both eyes of the user, and obtaining the observation distance from the gazed object to the eye of the user by means of the intersection point of the directions of line-of-sight of both eyes of the user.

There can be various implementations for the step S122c, for example, the corresponding zooming-in factor is determined according to a piecewise function corresponding to the observation distance or by looking up in a table. This implementation selects a relatively quick way of looking up in the table, that is, a corresponding relationship table between observation distances and zooming-in factors is preset, and then, in the execution process of the method, the currently desired zooming-in factor is determined by looking up in the table. The zooming-in factor can be 1, can be a constant greater than 1, and can also be a fraction greater than 0 and smaller than 1. The following table 2 is an example of a zooming-in factor table; it can be seen that corresponding to each observation distance $D_O$, a preset zooming-in factor $T_2$ is stored in the table 2, for example, when the observation distance $D_O$ is 20 m, the corresponding zooming-in factor can be determined to be 5 by looking up in the table.

TABLE 2 second zooming-in factor table

| observation distance (m) | zooming-in factor $T_2$ |
| --- | --- |
| $D_0 > 100$ | 10 |
| $10 < D_0 \leq 100$ | 5 |
| $1 < D_0 \leq 10$ | 2 |
| $0.3 < D_0 \leq 1$ | 1 |
| $0.1 < D_0 \leq 0.3$ | $\frac{2}{3}$ |
| $0 < D_0 \leq 0.1$ | $\frac{1}{2}$ |

In the step S123c, the image of the gazed object at the user's eye fundus is generally zoomed-in by the zooming-in factor determined in step S122c by means of optical zooming. For example, when the observation distance from the gazed object to the eye of the user is 20 m, and the zooming-in factor determined in step S122c is 2, after the optical zoom processing of step S123c, the area ratio of the new image of the gazed object at the user's eye fundus will be twice that before the zoom processing; when the observation distance from the gazed object to the eye of the user is 0.5 m, and the zooming-in factor determined in step S122c is 1, step S123c does not perform the optical zoom processing, and the area ratio of the image of the gazed object at the user's eye fundus is not changed; and when the observation distance from the gazed object to the eye of the user is 0.1 m, and the zooming-in factor determined in step S122c is ½, after the optical zoom processing of step S123c, the area ratio of the new image of the gazed object at the user's eye fundus will be half that before the zoom processing.

According to the visual principle that an object looks larger when nearer and smaller when farther, when the observation distance from a gazed object to an eye of a user is relatively far, the target image of the gazed object at the user's eye fundus is relatively small, and when the observation distance from a gazed object to an eye of a user is relatively near, the target image of the gazed object at the user's eye fundus is relatively large. It can be seen that via the above-mentioned zoom processing, when the observation distance is relatively far, the target image will be zoomed-in, which is equivalent to bringing the gazed object nearer for viewing; and when the observation distance is relatively near, the target image will be zoomed-out, which is equivalent to taking the gazed object farther away for viewing. Thus, an excessively small or large actual area ratio of the target image of a gazed object at the eye fundus of a user will be adjusted to an appropriate ratio, which facilitates the user in viewing the gazed object. In addition, in above steps S122c and S123c, it can also be set that the zoom processing is performed only when the observation distance is too far (for example, greater than 10 m), or it can also be set that zoom processing is performed only when the observation distance is too near (for example, smaller than 0.1 m).

In the fourth implementation of the method in this embodiment, the method also includes:

S130d: presetting a target focusing point distance of an eye of a user, and a buffer zone of the target focusing point distance.

The step S120 includes:

S121d: detecting the actual focusing point distance of the eye of the user; and

S122d: changing the size of the target image according to the target focusing point distance, the actual focusing point distance, and the buffer zone.

Particularly, in the step S130d, the target focusing point distance is a focusing point distance expected to be achieved of the eye of the user, i.e., an expected value of the observation distance of the user to observe the gazed object, which for example, can be 10 m. When the actual focusing point distance of the eye of the user, i.e., the actual observation distance, is the target focusing point distance, the user will feel that the gazed object is at an appropriate distance from himself/herself, and the image at the eye fundus will not be too large or too small. In addition, a target focusing point distance which allows a user to feel comfortable generally is not a distance point, but more likely to be a distance range, therefore, a buffer zone of the target focusing point distance is also set in the step S130d. Generally, the buffer zone of the target focusing point distance is a predetermined distance range on the two sides of the target focusing point distance. For example, by assuming the target focusing point distance to be $D_T$, the buffer zone can be $((D_T-D_L, D_T) \cup (D_T, D_T+D_R))$, where $D_T$, $D_L$ and $D_R$ are constants. Thus, the focusing point distance range $(D_T-D_L, D_T+D_R)$ is set to be a focusing point distance range which allows a user to feel comfortable. $D_L$ can be equal to $D_R$, in this case, the third sub-buffer zone $((D_T-D_L, D_T)$ and fourth sub-buffer zone $(D_T, D_T+D_R)$ of the target focusing point distance have the same size, with $D_T$ as the center thereof; $D_L$ can also not be equal to $D_R$, in this case, the third sub-buffer zone $((D_T-D_L, D_T)$ and fourth sub-buffer zone $(D_T, D_T+D_R)$ have different sizes.

In the step S121d, the actual focusing point distance of the eye of the user can be detected according to steps S210-S240 in the previous implementation, which is not described here redundantly.

The step S122d includes:

in the case where the actual focusing point distance is smaller than the target focusing point distance, and the actual focusing point distance is outside the buffer zone of the target focusing point distance, increasing the actual focusing point distance to the target focusing point distance, so as to zoom-out the target image; and in the case where the actual focusing point distance is greater than the target focusing point distance, and the actual focusing point distance is outside the buffer zone of the target focusing point distance, decreasing the actual focusing point distance to the target focusing point distance, so as to zoom-in the target image.

In some implementations requiring simple control, the buffer zone of the target focusing point distance can also be set to zero, that is, the buffer zone of the target focusing point distance is not present, and in this case, the step S122d includes:

in the case where the actual focusing point distance is smaller than the target focusing point distance, increasing the actual focusing point distance to the target focusing point distance, so as to zoom-out the target image; and in the case where the actual focusing point distance is greater than the target focusing point distance, decreasing the actual focusing point distance to the target focusing point distance, so as to zoom-in the target image.

It should be understood that in various embodiments of the present invention, the value of the number of order for each procedure described above does not mean the execution sequence thereof, and the execution sequence of each procedure should be determined according to the function and internal logic thereof, and should not be any limitation on the implementation procedure of the embodiments of the present invention.

In conclusion, the method in this embodiment determines a gazed object of a user according to an image at the user's eye fundus, and automatically changes the size of the target image of the gazed object at the user's eye fundus by optical zoom processing, according to the size of the target image of the gazed object at the user's eye fundus, or according to an observation distance from the gazed object to an eye of the user, so that the user feels that the gazed object is observed with an appropriate size of the image at the eye fundus at an appropriate distance, facilitating the user in observing the gazed object.

In addition, the embodiments of the present application also provide a computer readable medium, comprising computer readable instructions which perform the following operations when being executed: executing the operations of steps S110 and S120 of the method in the implementation shown in FIG. 1.

Figure 2:
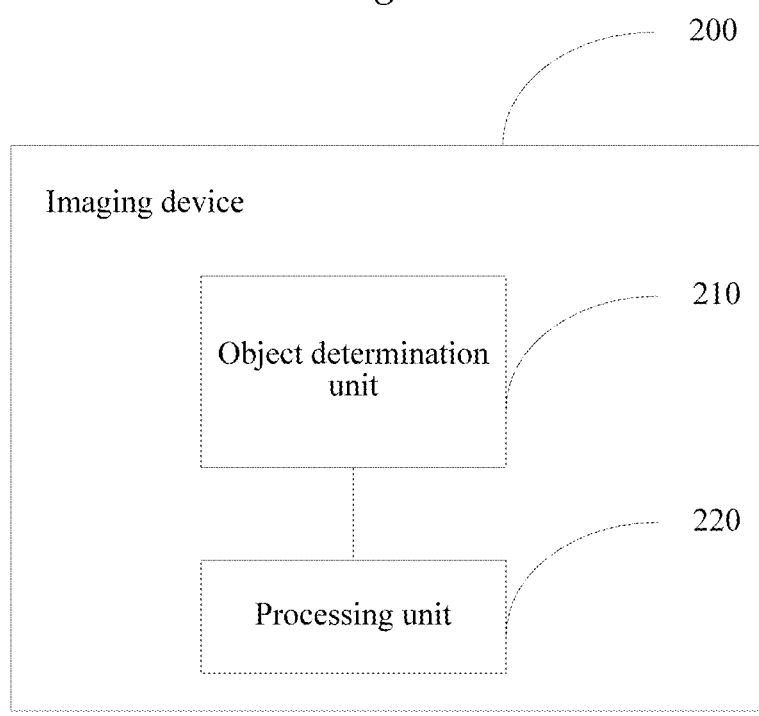
FIG. 2 is an example schematic diagram of a module structure of the imaging device in the embodiments of the present application.

FIG. 2 is a schematic diagram of a module structure of the imaging device in the embodiments of the present application; as shown in FIG. 2, the device 200 comprises: an object determination unit 210 and a processing unit 220.

The object determination unit 210 is configured to determine a gazed object of a user according to an image at the user's eye fundus.

The processing unit 220 is configured to change the size of the target image of the gazed object at the user's eye fundus according to a predetermined zooming rule.

The imaging device in this embodiment determines a gazed object of a user according to an image at the user's eye fundus, and changes the size of the target image of the gazed object at the user's eye fundus according to a predetermined zooming rule, so that the user feels that the gazed object is observed with an appropriate size of the image at the eye fundus at an appropriate distance, thereby facilitating a user to observe a gazed object.

Figure 3:
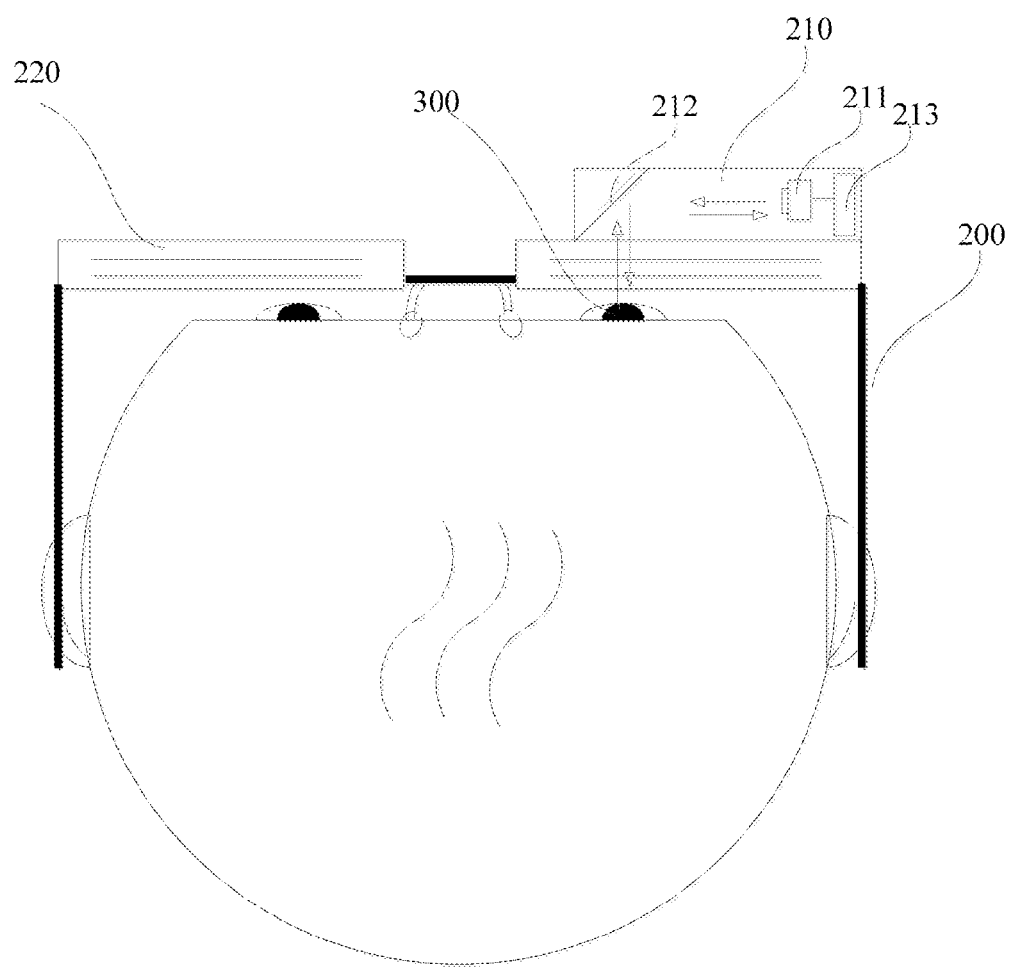
FIG. 3 is an example schematic diagram of a specific example where the imaging device in the embodiments of the present application is applied to glasses.

FIG. 3 is a schematic diagram of a specific example where the imaging device 200 is applied to glasses; the glasses can be ordinary glasses, and can also be optical devices, such as a helmet, a front windshield, etc.

As shown in FIG. 3, the object determination unit 210 can be provided on one lens of the glasses, and can comprise: an image collection subunit 211, a first beam splitting plate 212 and an image analysis subunit 213. Light reflected by an eye 300 is reflected via the first beam splitting plate 212 and enters the image collection subunit 211, so that the image collection subunit 211 collects images at the user's eye fundus; the image analysis subunit 213 analyzes the collected images at the eye fundus, and extracts an image corresponding to the fovea centralis of the macular area, so as to determine the gazed object of the user. The image collection subunit 211 can adopt a micro camera, and can also directly use a photosensitive imaging device, such as CCD (Charge-coupled Device) or CMOS (Complementary Metal Oxide Semiconductor). The function of the image analysis subunit 213 can be realized via a processor, and the processor can be a central processing unit CPU, or a specific integrated circuit ASIC (Application Specific Integrated Circuit), or be configured as one or more integrated circuits which implement the embodiments of the present application. The function of the image analysis subunit 213 is realized via one or more programs executed by the processor. The image analysis subunit 213 can also comprise a memory configured to store the programs.

The processing unit 220 can be integrated in a lens of the glasses configured to change the size of the target image of the gazed object at the user's eye fundus by the optical zoom processing according to a predetermined zooming rule, and the constitution of the processing unit 220 will be described in detail according to situations.

Figure 4:
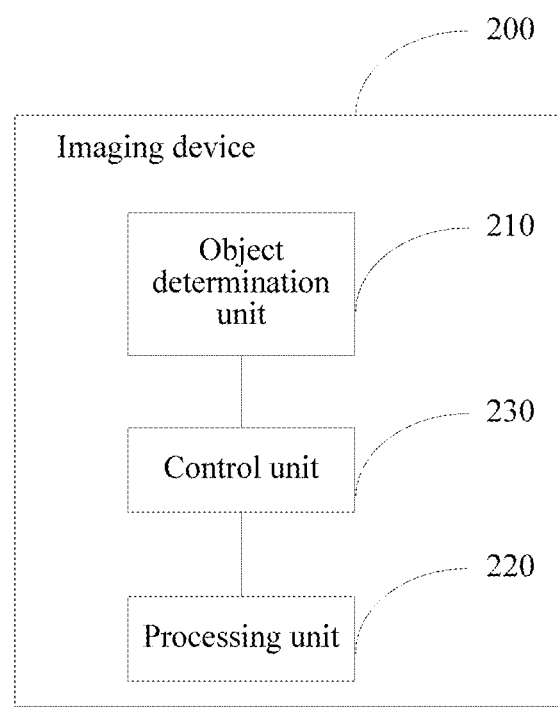
FIG. 4 is an example schematic diagram of a module structure of one imaging device in the embodiments of the present application.

In addition, in order to avoid the occurrence of the case where under a non-gazing state of a user, for example, in a process of an arbitrary glancing, an image at the user's eye fundus is changed, influencing the user experience, as shown in FIG. 4, the imaging device 200 can also comprise: a control unit 230. The control unit 230 is configured to activate the processing unit 220 in the case where the user has observed the gazed object for a time period exceeding a predetermined time. Generally, the control unit 230 comprises a timer configured to monitor the residence time of an image corresponding to the fovea centralis of the macula lutea; in the case where the residence time of the image of one and the same object corresponding to the fovea centralis exceeds the predetermined time, it can be judged that the user is currently gazing the object, therefore the processing unit 220 can be activated.

Figure 5A:
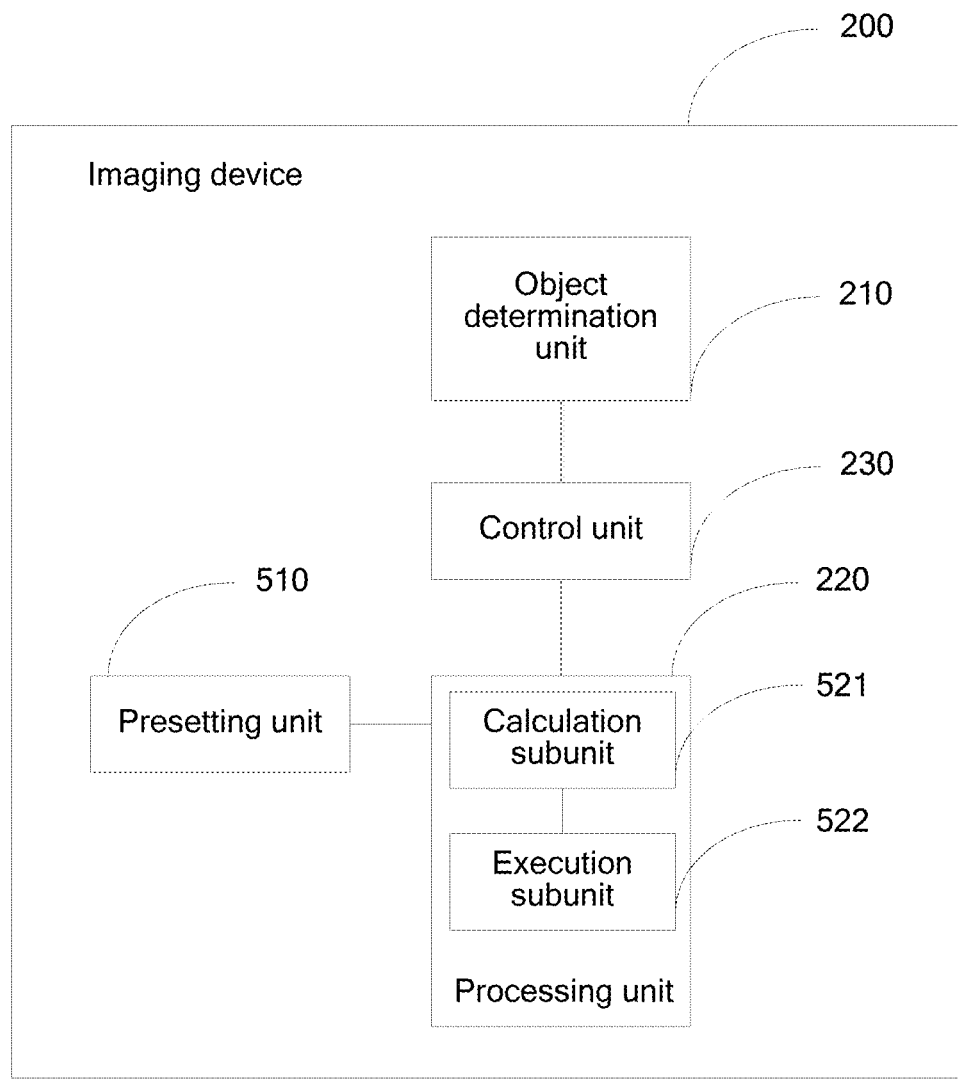
FIG. 5a is an example schematic diagram of a module structure of a first implementation of the imaging device in the embodiments of the present application.

The imaging device 200 will be illustrated hereinafter according to implementations:

as shown in FIG. 5a, in the first implementation of the imaging device in this embodiment, the device 200 also comprises: a presetting unit 510.

The presetting unit 510 is configured to preset a target area ratio of the target image, and a buffer zone of the target area ratio. The target area ratio and the buffer zone can be set when the device 200 leaves the factory, and can also be set by the user according to personal preferences. The setting specifically can be done by means of keys, a touch screen, sound control and the like.

Correspondingly, the processing unit 220 comprises: a calculation subunit 521 and an execution subunit 522.

The calculation subunit 521 is configured to calculate the actual area ratio of the target image at the user's eye fundus.

The area of the eye fundus of the user generally is a fixed value, and after a target image is determined through the object determination unit 210, the area of the target image can be acquired, then the actual area ratio of the target image at the user's eye fundus can be obtained.

The execution subunit 522 is configured to change the size of the target image according to the target area ratio, the actual area ratio, and the buffer zone.

Particularly, the execution subunit 522 is configured to zoom-in the target image to the target area ratio in the case where the actual area ratio is smaller than the target area ratio and the actual area ratio is outside the buffer zone, and zooming-out the target image to the target area ratio in the case where the actual area ratio is greater than the target area ratio and the actual area ratio is outside the buffer zone. In addition, in some product applications, the buffer zone can also be absent, that is, the buffer zone is set to be zero; in this case, the execution subunit 522 is configured to zoom-in the target image to the target area ratio in the case where the actual area ratio is smaller than the target area ratio, and zooming-out the target image to the target area ratio in the case where the actual area ratio is greater than the target area ratio.

It can be seen that the imaging device can zoom-in the image of a relatively far relatively small gazed object at the eye fundus of a user, and can also zoom-out the image of a relatively near relatively large gazed object at the user's eye fundus, to alleviate visual fatigue of the user under different use scenes.

Figure 5B:
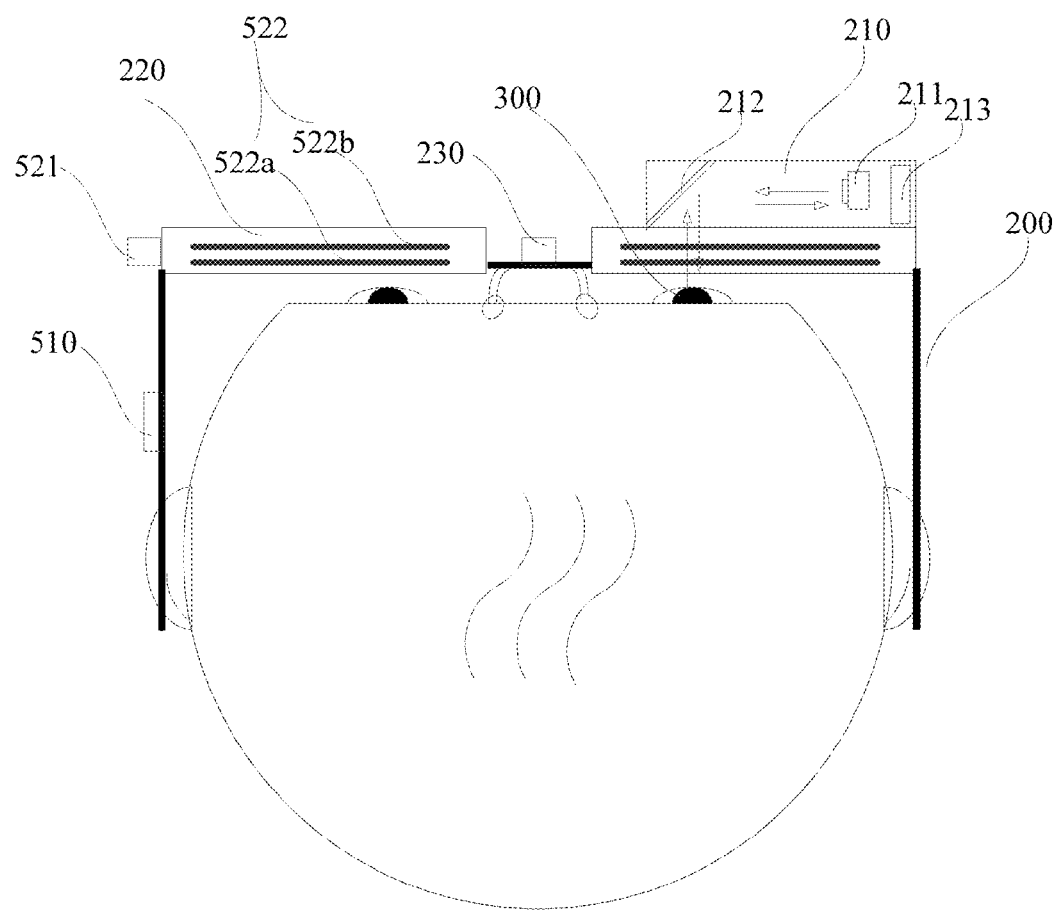
FIG. 5b is an example schematic diagram of a specific example where the first implementation of the imaging device in the embodiments of the present application is applied to glasses.

FIG. 5b is a schematic diagram of a specific example where the first implementation of the imaging device of this embodiment is applied to glasses.

As shown in FIG. 5b, the presetting unit 510 can be provided on the frame of glasses, and can receive setting information by means of keys, a touch screen, sound control and the like.

The control unit 230 is arranged at a position between the two lenses, and configured to activate the processing unit 220 in the case where the user has observed the gazed object for a time period exceeding a predetermined time.

The processing unit 220 comprises a calculation subunit 521 capable of being arranged on one side of the left lens, and an execution subunit 522 capable of being arranged inside a lens.

The calculation subunit 521 can also be realized by adopting the same processor as for the image analysis subunit 213, that is, the task of calculating the actual area ratio of the target image at the user's eye fundus is also completed while the image at the eye fundus is analyzed via the image analysis subunit 213, so that the structure of the glasses can be simplified.

The execution subunit 522 comprises a lens set composed of at least two lenses, and at least one lens in the at least two lenses has adjustable imaging parameters. For simplicity, the execution subunit 522 in FIG. 5b comprises a first lens 522a close to the side of the eye and a second lens 522b close to the side of the gazed object, and at least one lens in the first lens 522a and second lens 522b has adjustable imaging parameters.

The imaging parameter can be the focal length; the at least one lens having adjustable imaging parameters is abbreviated as adjustable lens, then the adjustment of the focal length of the adjustable lens can be: 1) adjusting the focal length by adjusting the curvature of at least one surface of the adjustable lens, for example, the adjustable lens comprising a cavity composed of two transparent layers, and the curvature being adjusted by increasing or decreasing a liquid medium in the cavity composed of the two transparent layers, in which case, information described above about changing the size of the target image, for example, can be that the amount of liquid medium is decreased or increased by a certain value; and 2) adjusting the focal length by changing the refractive index of the adjustable lens, for example, the adjustable lens being filled with a specific liquid crystal medium, and the arrangement of the liquid crystal medium being adjusted by adjusting the voltage of a respective electrode for the liquid crystal medium, so as to change the refractive index of the adjustable lens, in which case, information described above about changing the size of the target image, for example, can be that the electrode voltage is increased or decreased by a certain value.

Besides the above-mentioned focal length, the imaging parameters can also comprise: the relative position between the lenses. Here, the relative position between the lenses can be changed by adjusting the relative distance thereof in the optical axis direction, and/or the relative position thereof in a direction perpendicular to the optical axis, and/or the relative rotation angle around the optical axis between the lenses.

The first lens 522a can be arranged so that the curvature of the side thereof toward the eye 300 of the user is adjustable, the second lens 522b can be arranged so that the curvature of the side thereof toward the gazed object is adjustable, and the positions of the first lens 522a and second lens 522b are fixedly provided, so that the glasses have a simple structure, and are light, thin and portable.

Figure 6A:
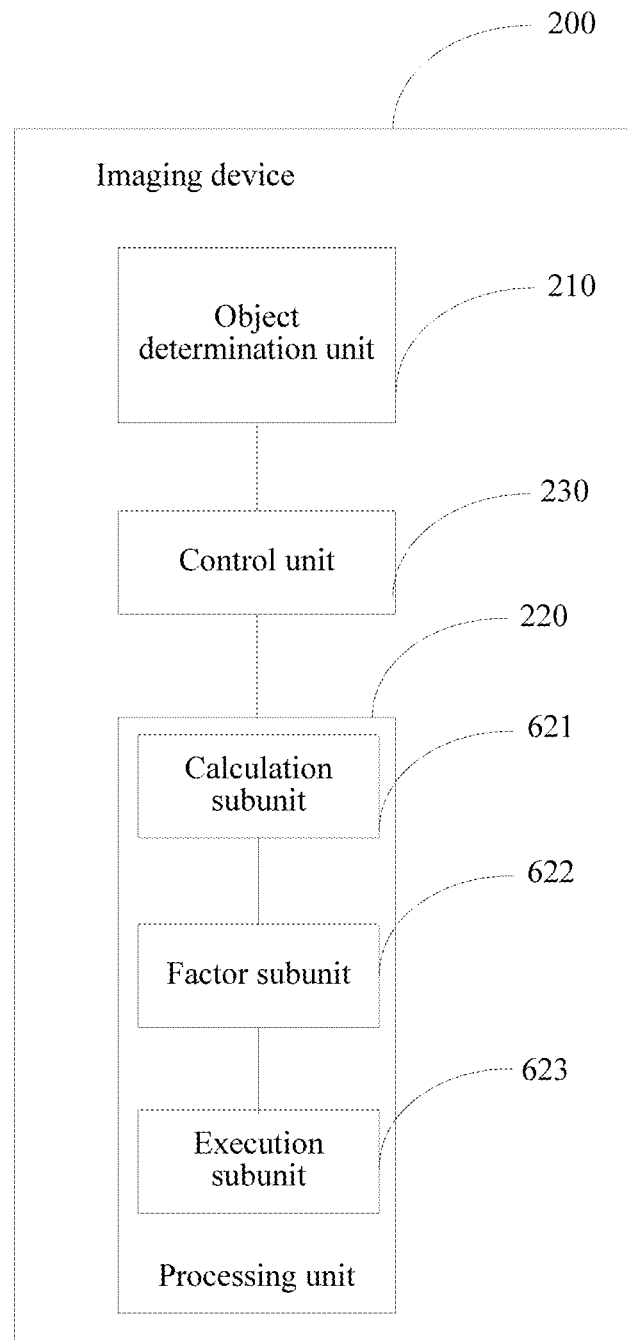
FIG. 6a is an example schematic diagram of a module structure of a second implementation of the imaging device in the embodiments of the present application.

As shown in FIG. 6a, in the second implementation of the imaging device in this embodiment, the processing unit 220 of the device 200 comprises: a calculation subunit 621, a factor subunit 622 and an execution subunit 623.

The calculation subunit 621 is configured to calculate the actual area ratio of the target image at the user's eye fundus. The calculation subunit 621 of this implementation can be the same as the previous implementation, and is not described redundantly.

The factor subunit 622, is configured to determine a corresponding zooming-in factor according to the actual area ratio.

There can be various implementations configured to determine the corresponding zooming-in factor according to the actual area ratio, for example, the corresponding zooming-in factor is determined according to a piecewise function corresponding to the actual area ratio, or by looking up in a table. This implementation selects a relatively quick way of looking up in the table, that is, a corresponding relationship table between actual area ratios and zooming-in factors is preset, and then, in the execution process of the method, the currently desired zooming-in factor is determined by looking up in the table. The corresponding relationship table can be as shown in table 1, and is not described redundantly.

The execution subunit 623 is configured to change the size of the target image according to the zooming-in factor.

Figure 6B:
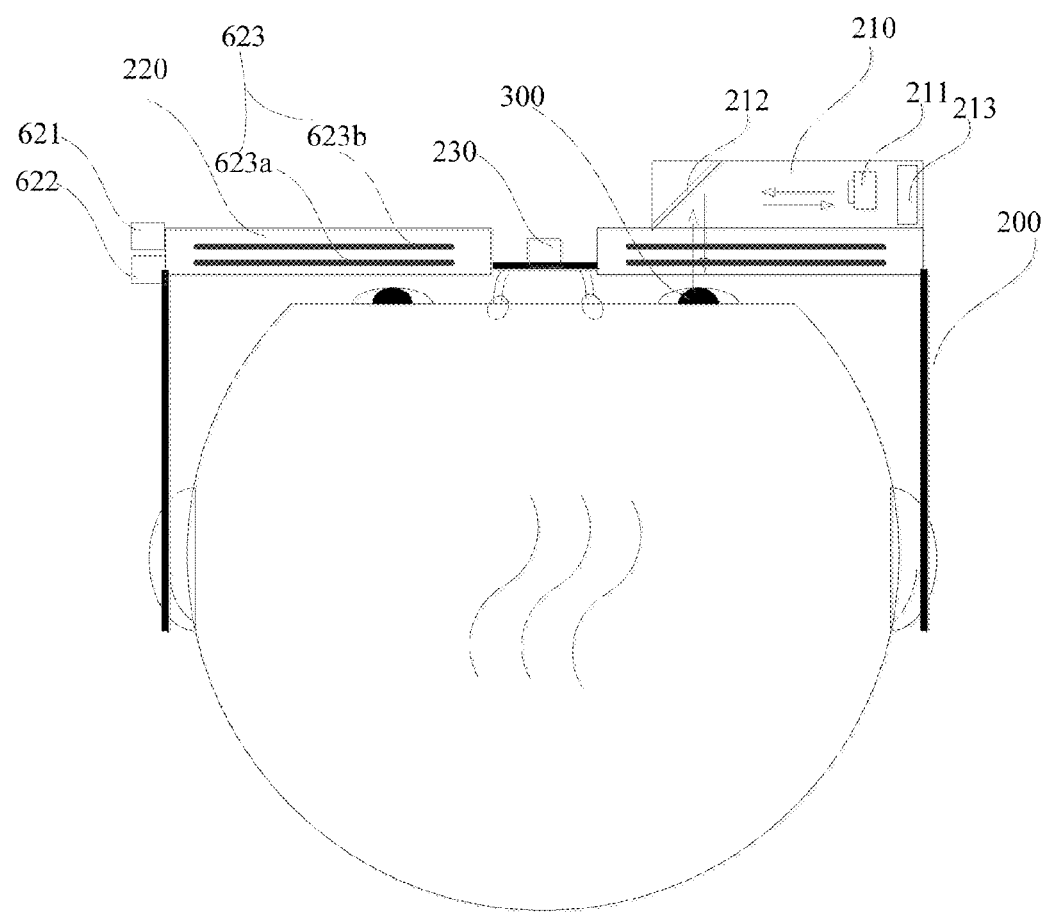
FIG. 6b is an example schematic diagram of a specific example where the second implementation of the imaging device in the embodiments of the present application is applied to glasses.

FIG. 6b is a schematic diagram of a specific example where the second implementation of the device of this embodiment is applied to glasses.

As shown in FIG. 6b, the calculation subunit 621 and the factor subunit 622 can be independently arranged on one side of the left lens configured to calculate the actual area ratio of the target image at the user's eye fundus and determining a corresponding zooming-in factor according to the actual area ratio respectively. The calculation subunit 621 and the factor subunit 622 can also be integrated and arranged together, or further, the functions of the calculation subunit 621, the factor subunit 622 and the image analysis subunit 213 are integrally realized via one processor, to reduce the weight of the glasses. When the factor subunit 622 determines a zooming-in factor by looking up in a table, it should also comprise a memory configured to store the corresponding relationship table.

The execution subunit 623 is substantially the same as the previous implementation. For simplicity, in FIG. 6b, the execution subunit 623 can comprise a first lens 623a close to the side of the eye and a second lens 623b close to the side of the gazed object, and at least one lens in the first lens 623a and second lens 623b has adjustable imaging parameters. The realization principle of the execution subunit 623 is substantially the same as the previous implementation, and is not described redundantly.

Figure 7A:
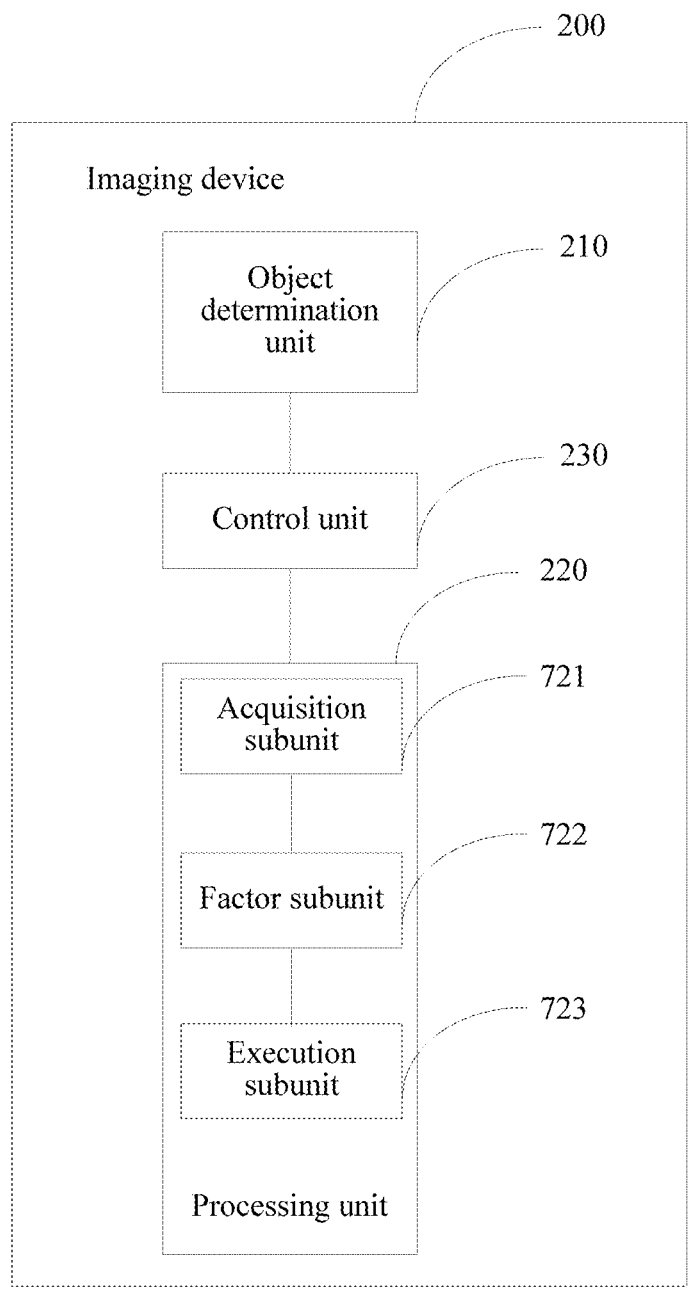
FIG. 7a is an example schematic diagram of a module structure of a third implementation of the imaging device in the embodiments of the present application.

As shown in FIG. 7a, in the third implementation of the imaging device in this embodiment, the processing unit 220 of the device 200 comprises: an acquisition subunit 721, a factor subunit 722 and an execution subunit 723.

Figure 7B:
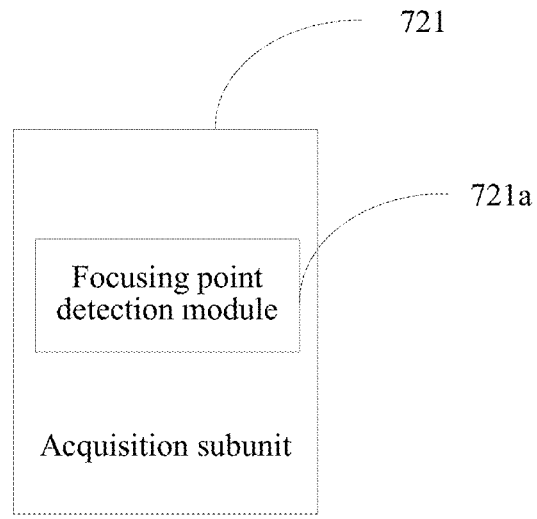
FIG. 7b is an example schematic diagram of a module structure of the acquisition subunit in the embodiments of the present application.

The acquisition subunit 721 is configured to acquire an observation distance from the gazed object to an eye of a user. The acquisition subunit 721 can be realized in the following ways:

as shown in FIG. 7b, in an optional implementation, the acquisition subunit 721 comprises: a focusing point detection module 721a configured to detect the actual focusing point distance of the eye of the user, and taking the actual focusing point distance as the observation distance from the gazed object to the eye of the user. The focusing point detection module 721a can be realized by adopting an eye focusing point detection system, which will be illustrated individually in detail hereafter.

Figure 7C:
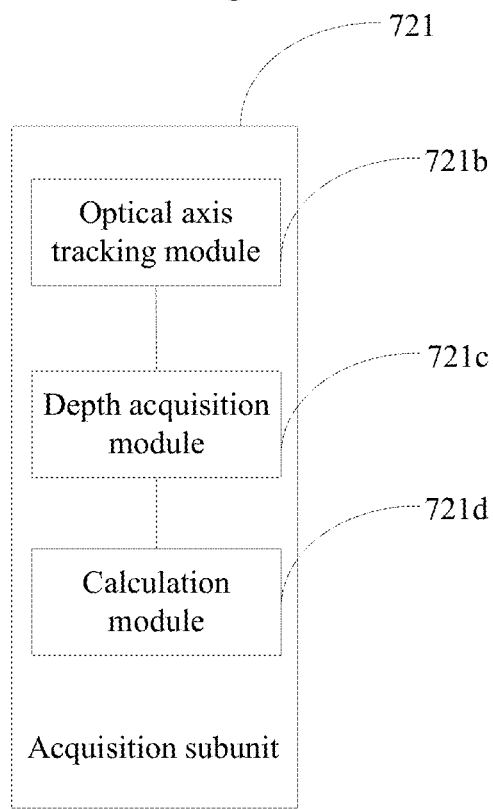
FIG. 7c is an example schematic diagram of another module structure of the acquisition subunit in the embodiments of the present application.

Alternatively, as shown in FIG. 7c, in another optional implementation, the acquisition subunit 721 comprises:

an optical axis tracking module 721b configured to track the direction of line-of-sight of the eye of the user;

a depth acquisition module 721c configured to acquire the scene depth of the position where the gazed object is located according to the direction of line-of-sight; and a calculation module 721d configured to calculate according to the scene depth to obtain the observation distance from the gazed object to the eye of the user.

Figure 7D:
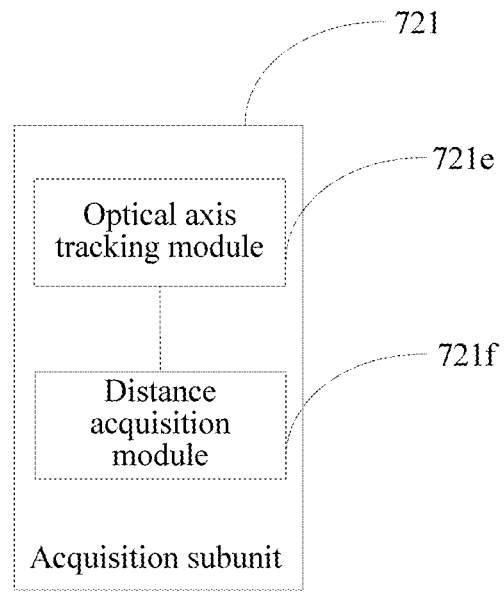
FIG. 7d is an example schematic diagram of yet another module structure of the acquisition subunit in the embodiments of the present application.

Alternatively, as shown in FIG. 7d, in another optional implementation, the acquisition subunit 721 comprises:

an optical axis tracking module 721e configured to track the directions of line-of-sight of both eyes of the user; and a distance acquisition module 721f configured to obtain the observation distance from the gazed object to the eye of the user by means of the intersection point of the directions of line-of-sight of both eyes of the user.

The factor subunit 722 is configured to determine a corresponding zooming-in factor according to the observation distance.

There can be various implementations for the factor subunit 722, for example, the corresponding zooming-in factor is determined according to a piecewise function corresponding to the observation distance or by looking up in a table. This implementation selects a relatively quick way of looking up in the table, that is, a corresponding relationship table between observation distances and zooming-in factors is preset, and then, in the execution process, the currently-desired zooming-in factor is determined by looking up in the table. The corresponding relationship table between observation distances and zooming-in factors can be as shown in the table 2, and is not described redundantly.

The execution subunit 723 is configured to change the size of the target image according to the zooming-in factor.

Figure 8A:
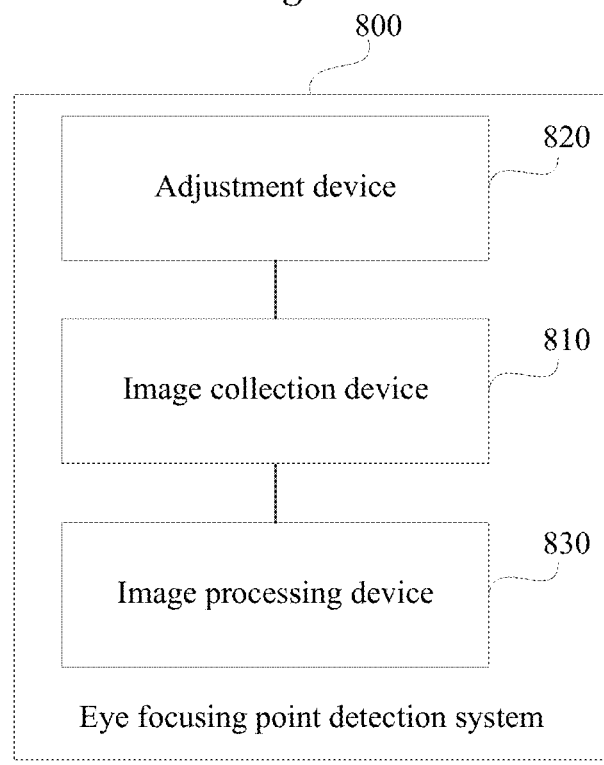
FIG. 8a is an example schematic diagram of a module structure of the eye focusing point detection system in the embodiments of the present application.

The eye focusing point detection system is illustrated in detail hereafter. As shown in FIG. 8a, the eye focusing point detection system 800 can comprise:

an image collection device 810 configured to collect images presented at the eye fundus of a user; an adjustment device 820 configured to adjust imaging parameters between the eye and the image collection device 810, so that the image collection device 810 obtains images with a definition greater than a predetermined value; and an image processing device 830 configured to process the images obtained by the image collection device 810 to obtain optical parameters of the eye corresponding to the images with a definition greater than the predetermined value. In order to improve the precision, the image processing device 830 can select the image with the highest definition from the images with a definition greater than the predetermined value, and calculate the optical parameters of the eye according to the image with the highest definition.

This system 800 obtains the optical parameters of the eye corresponding to the images with a definition greater than the predetermined value by analyzing and processing the images at the eye fundus, and then can calculate the current actual focusing point distance of the eye.

The image presented at the "eye fundus" herein mainly is an image presented on the retina, which can be an image of the eye fundus itself, or can also be an image of another physical body projected to the eye fundus.

Figure 8B:
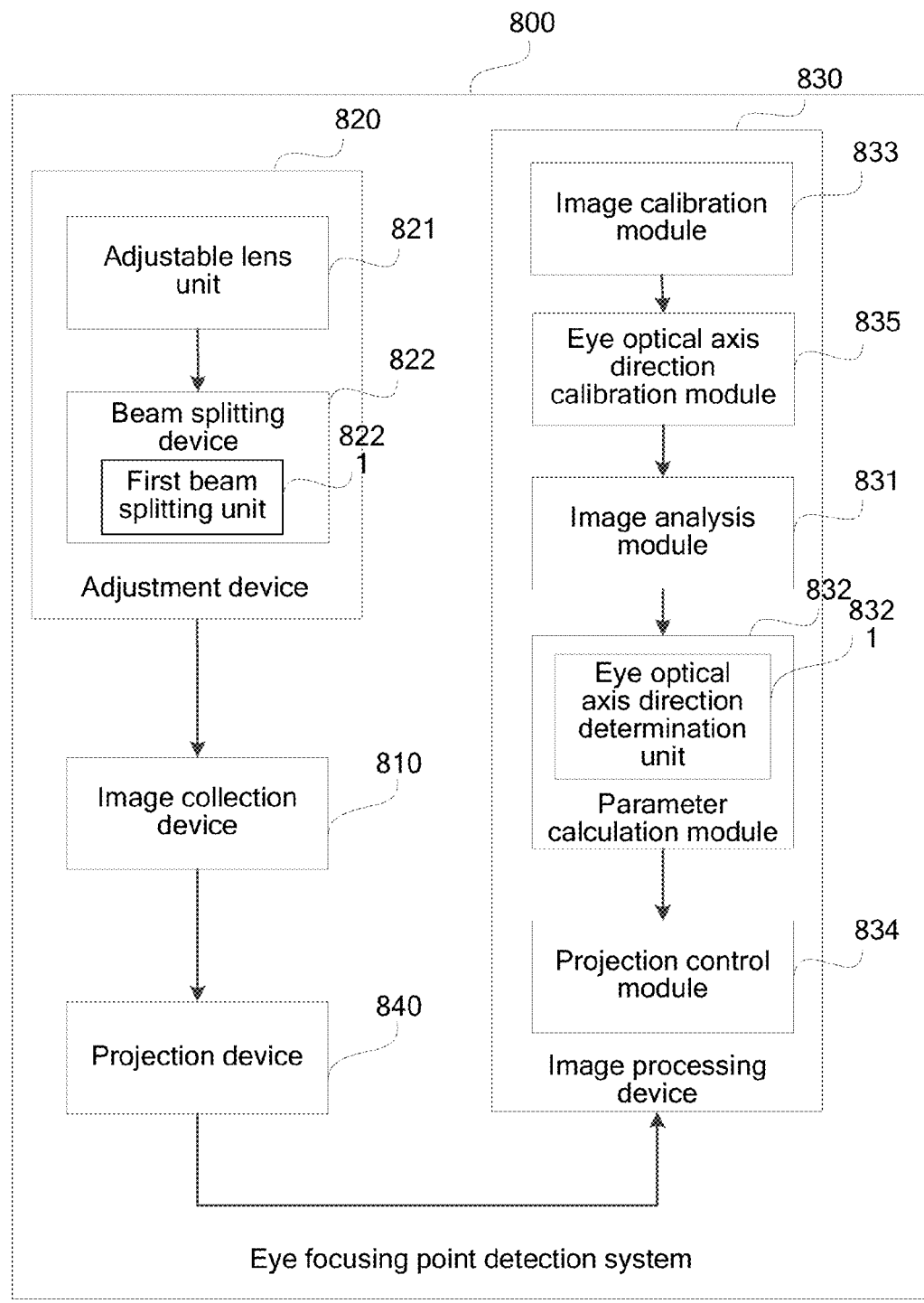
FIG. 8b is an example schematic diagram of a module structure of one eye focusing point detection system in the embodiments of the present application.

As shown in FIG. 8b, in a possible implementation, the image collection device 810 is a micro camera, and in another possible implementation in the embodiments of the present application, the image collection device 810 can also directly use a photosensitive imaging device, such as a CCD device or a CMOS device, etc.

In a possible implementation, the adjustment device 820 comprises: an adjustable lens unit 821 which is located on the optical path between an eye and the image collection device 810, and the focal length of which is adjustable and/or the position of which in the optical path is adjustable. The equivalent focal length of a system between an eye and the image collection device 810 is rendered adjustable by means of the adjustable lens unit 821, and by adjusting the adjustable lens unit 821, the image collection device 810 is enabled to obtain images with a definition greater than the predetermined value at the eye fundus in a certain position or state of the adjustable lens unit 821. In this implementation, the adjustable lens unit 821 is adjusted continuously in real time during detection.

In a possible implementation, the adjustable lens unit 821 is a lens with adjustable focal length, configured to complete the adjustment of the focal length of itself by adjusting the refractive index and/or shape of itself. In particular, 1) the focal length is adjusted by adjusting the curvature of at least one surface of the lens with adjustable focal length, for example, adjusting the curvature of the lens with adjustable focal length by increasing or decreasing a liquid medium in a cavity composed by two transparent layer; 2) the focal length is adjusted by changing the refractive index of the lens with adjustable focal length, for example, a specific liquid crystal medium is filled in the lens with adjustable focal length, and the arrangement of the liquid crystal medium is adjusted by adjusting the voltage of a respective electrode of the liquid crystal medium, so as to change the refractive index of the lens with adjustable focal length.

In another possible implementation, the adjustable lens unit 821 comprises: a lens set configured to complete the adjustment of the focal length of the lens set itself by adjusting the relative positions of the lenses in the lens set.

In addition to the above-mentioned two ways of changing the optical path parameters of the system by adjusting the characteristics of the adjustable lens unit 821 itself, the optical path parameters of the system can also be changed by adjusting the position of the adjustable lens unit 821 in the optical path.

In a possible implementation, in order not to affect the viewing experience of a user to an observed object, and in order to enable the system to be portably applied to a wearable apparatus, the adjustment device 820 also comprises: a beam splitting device 822 configured to form a light transfer path between an eye and the observed object as well as between the eye and the image collection device 810.

In this way, an optical path can be folded to reduce the volume of the system, and at the same time, influence on other experiences of the user are avoided as much as possible.

In this implementation, the beam splitting device 822 can comprise: a first beam splitting unit 8221 which is located between an eye and an observed object, and configured to transmit the light from the observed object to the eye and transferring the light from the eye to the image collection device.

The first beam splitting unit can be a beam splitter, a beam-splitting optical waveguide (including an optical fiber) or other suitable beam splitting apparatuses.

In a possible implementation, the image processing device 830 of the system comprises an optical path calibration module configured to calibrate the optical path of the system, for example, aligning and calibrating the optical axis of the optical path, etc., to ensure the precision of measurement.

In a possible implementation, the image processing device 830 can also comprise:

an image analysis module 831 configured to analyze the images obtained by the image collection device to find the images with a definition greater than the predetermined value; and a parameter calculation module 832 configured to calculate optical parameters of an eye, according to the images with a definition greater than the predetermined value and known imaging parameters of the system corresponding to the images with a definition greater than the predetermined value.

In this implementation, the image collection device 810 is enabled to obtain the images with a definition greater than the predetermined value by means of the adjustment device 820, but it needs to find out the images with a definition greater than the predetermined value by means of the image analysis module 831, and therefore, the optical parameter of the eye can be calculated according to the images with a definition greater than the predetermined value and the known optical path parameters of the system. The optical parameter of an eye herein can include the optical axis direction of the eye.

In a possible implementation of the embodiments of the present application, the system also comprises: a projection device 840 configured to project a light spot to the eye fundus. In a possible implementation, the function of the projection device can be realized by means of a micro projector.

The light spot projected herein can have no specific pattern and be merely configured to illuminate the eye fundus.

In one implementation, the projected light spot includes a pattern with rich features. The rich features of the pattern can facilitate the detection and enhance the detection precision. What is shown in FIG. 8e is an exemplary diagram of a light spot pattern 850, which pattern can be formed by a light spot pattern generator, such as a frosted glass; and what is shown in FIG. 8f is an image at the eye fundus photographed when the light spot pattern 850 is projected thereon.

In order not to affect the normal viewing of an eye, the light spot is an infrared light spot invisible to the eye.

In this case, in order to reduce the disturbance of other spectra:

an emergence surface of the projection device can be provided with a transmission filter for light invisible to the eye; and an incidence surface of the image collection device is provided with a transmission filter for light invisible to the eye.

In a possible implementation, the image processing device 830 also comprises:

a projection control module 834 configured to control the brightness of light spot projected by the projection device according to a result obtained by the image analysis module.

For example, the projection control module 834 can self-adaptively adjust the brightness according to the characteristics of an image obtained by the image collection device 810. The characteristics of an image herein include the contrast of image features, and texture features, etc.

Here, a special circumstance of controlling the brightness of light spot projected by the projection device is turning-on or turning-off the projection device, for example, the projection device can be turned off periodically when a user continuously gazes one point; and when the eye fundus of a user is bright enough, a light emitting source can be turned off and the distance from the current focusing point of the line-of-sight of an eye to the eye can be detected using only the information about the eye fundus.

Furthermore, the projection control module 834 can also control the brightness of light spot projected by the projection device according to the ambient light.

In a possible implementation, the image processing device 830 also comprises: an image calibration module 833 configured to calibrate an image at the eye fundus to obtain at least one reference image corresponding to the image presented at the eye fundus.

The image analysis module 831 compares the image obtained by the image collection device 830 with the reference image and calculates to obtain the images with a definition greater than the predetermined value. Here, the images with a definition greater than the predetermined value can be images obtained which has a difference from the reference image smaller than a threshold. In this implementation, the difference between the images obtained currently and the reference image is calculated by means of an existing image processing algorithm, for example, using a classical automatic focusing algorithm for phase difference.

In a possible implementation, the parameter calculation module 832 comprises:

an eye optical axis direction determination unit 8321 configured to obtain an eye optical axis direction according to the features of an eye corresponding to the images with a definition greater than the predetermined value. The direction of line-of-sight can be obtained according to the eye optical axis direction and a fixed angle included between the eye optical axis direction and the direction of line-of-sight.

The features of an eye herein can be acquired from the images with a definition greater than the predetermined value, or can also be acquired otherwise.

Figure 8C:
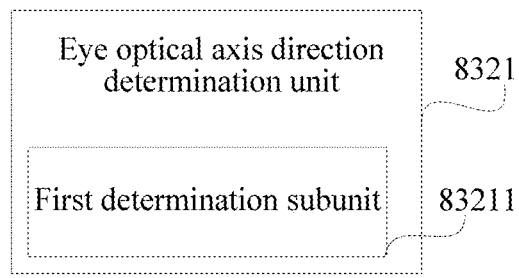
FIG. 8c is an example schematic diagram of a module structure of the eye optical axis direction determination unit in the embodiments of the present application.

As shown in FIG. 8c, in a possible implementation, the eye optical axis direction determination unit 8321 comprises: a first determination subunit 83211 configured to obtain the eye optical axis direction according to the features of the eye fundus corresponding to the images with a definition greater than the predetermined value. Compared with obtaining the eye optical axis direction by means of the features of the pupil and the eyeball surface, obtaining the eye optical axis direction by means of the features of the eye fundus has a higher accuracy.

When a light spot pattern is projected to the eye fundus, the size of the light spot pattern may be greater than a visible region of the eye fundus or smaller than that, wherein when the area of the light spot pattern is smaller than or equal to that of the visible region of the eye fundus, the eye optical axis direction can be determined by detecting the position of the light spot pattern on an image with respect to the eye fundus using a classical feature point matching algorithm (for example, a scale invariant feature transform (SIFT) algorithm); and when the area of the light spot pattern is greater than or equal to that of the visible region of the eye fundus, the eye optical axis direction can be determined by means of the position of the light spot pattern on the image obtained with respect to an original light spot pattern (obtained by an image calibration module) so as to determine the direction of line-of-sight of the user.

Figure 8D:
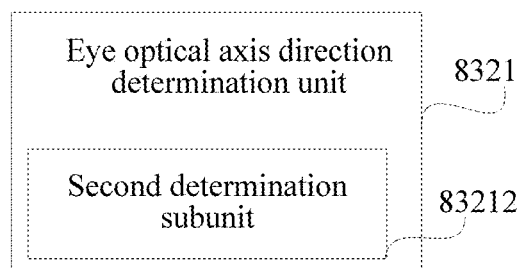
FIG. 8d is an example schematic diagram of another module structure of the eye optical axis direction determination unit in the embodiments of the present application.
Figure 8E:
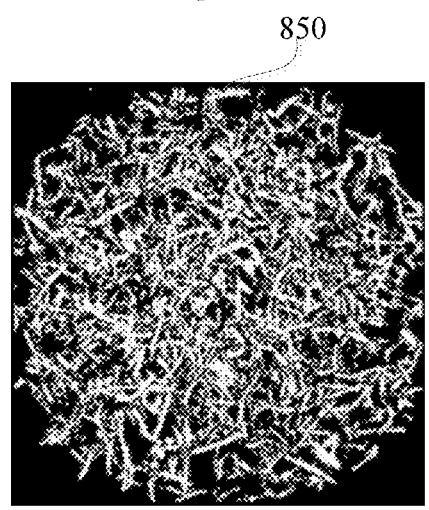
FIG. 8e is an example schematic diagram of a light spot pattern in the embodiments of the present application.
Figure 8F:
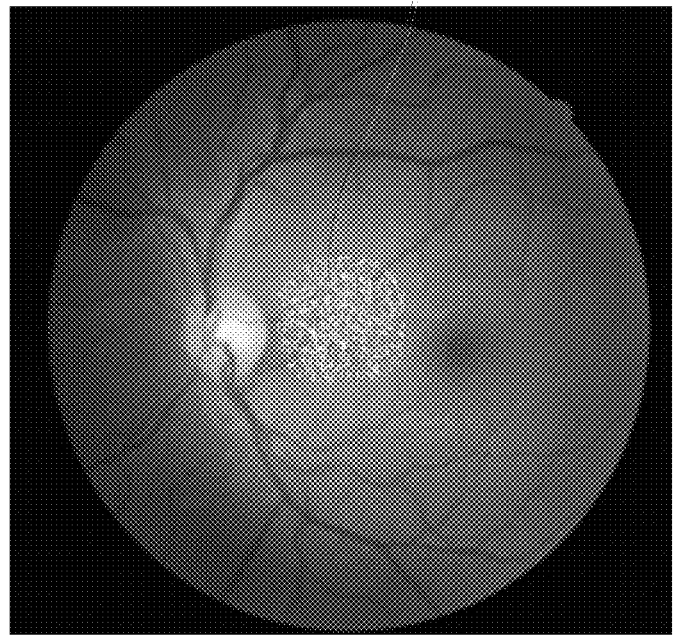
FIG. 8f is an example image at the eye fundus photographed when the light spot pattern in the embodiments of the present application is projected.

As shown in FIG. 8d, in another possible implementation, the eye optical axis direction determination unit 8321 comprises: a second determination subunit 83212 configured to obtain the eye optical axis direction according to the features of the eye pupil corresponding to the images with a definition greater than the predetermined value. The features of the eye pupil herein can be acquired from the images with a definition greater than the predetermined value, or can also be acquired otherwise. The obtainment of the eye optical axis direction by means of the features of the eye pupil is an existing technology, which is not described here redundantly.

As shown in FIG. 8b, in a possible implementation, the image processing device 830 also comprises: an eye optical axis direction calibration module 835 configured to calibrate the eye optical axis direction to determine above eye optical axis direction more accurately.

In this implementation, known imaging parameters of the system comprise fixed imaging parameters and real-time imaging parameters, wherein the real-time imaging parameters are parameter information about the adjustable lens unit corresponding to the images with a definition greater than the predetermined value, and the parameter information can be obtained by recording under acquiring the images with a definition greater than the predetermined value.

Figure 8G:
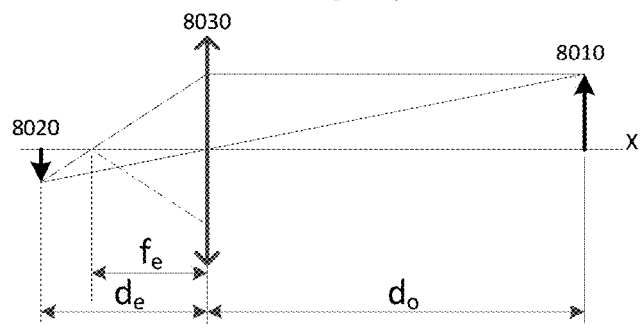
FIG. 8g is an example schematic diagram of eye imaging in the embodiments of the present application.

After the current optical parameters of an eye is obtained, the distance from the focusing point of an eye to the eye can be calculated, in particular:

what is shown in FIG. 8g is a schematic diagram of eye imaging, and equation (1) can be obtained from FIG. 8g in combination with the lens imaging equation in the classical optical theory:

$$\frac{1}{d_o} + \frac{1}{d_e} = \frac{1}{f_e} \quad (1)$$

where $d_o$ and $d_e$ are the distances from a currently observed object 8010 of an eye and from a real image 8020 on the retina respectively to an eye-equivalent lens 8030, $f_e$ is the equivalent focal length of the eye-equivalent lens 8030, and X is the direction of line-of-sight of the eye.

Figure 8H:
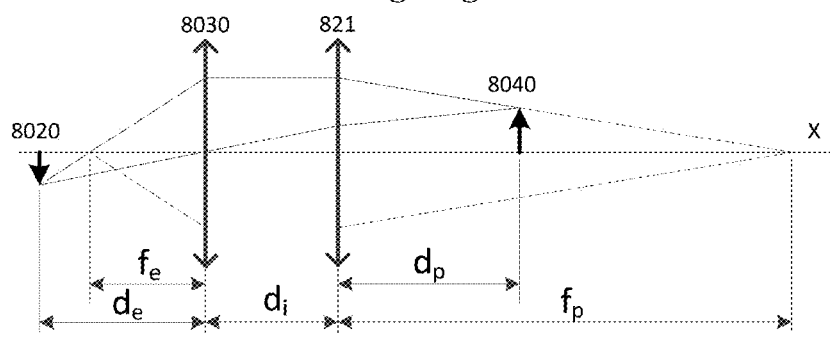
FIG. 8h is an example schematic diagram where the present application obtains a distance from the focusing point of an eye to the eye according to known optical parameters of the system and optical parameters of the eye.

What is shown in FIG. 8h is a schematic diagram where the distance from the focusing point of an eye to the eye is obtained according to the known optical parameters of the system and the optical parameters of the eye; in FIG. 8h, a light spot 8040 will form a virtual image via an adjustable lens unit 821, and by assuming the distance of the virtual image from the lens to be x, in combination with the equation (1), the following system of equations can be obtained:

$$\begin{cases} \dfrac{1}{d_p} - \dfrac{1}{x} = \dfrac{1}{f_p} \\ \dfrac{1}{d_i + x} + \dfrac{1}{d_e} = \dfrac{1}{f_e} \end{cases} \quad (2)$$

where $d_p$ is the optical equivalent distance from the light spot 8040 to the adjustable lens unit 821, $d_i$ is the optical equivalent distance from the adjustable lens unit 821 to the eye-equivalent lens 8030, $f_p$ is the focal length value of the adjustable lens unit 821, and $d_i$ is the distance from the eye-equivalent lens 8030 to the adjustable lens unit 821.

The distance $d_o$ from the current observed object 8010 (the focusing point of the eye) to the eye-equivalent lens 8030 (i.e. the actual focusing point distance of the eye) can be obtained as shown in equation (3) from (1) and (2):

$$d_o = d_i + \frac{d_p \cdot f_p}{f_p - d_p}. \tag{3}$$

Figure 9:
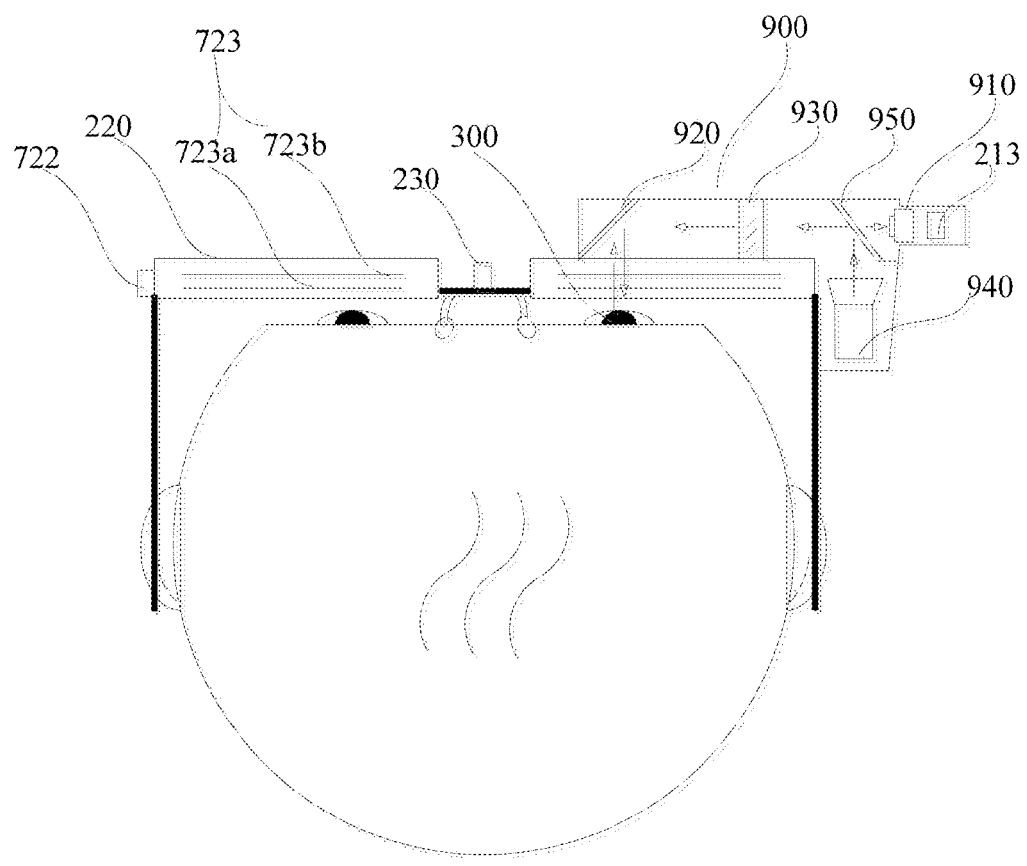
FIG. 9 is an example schematic diagram of a specific example where the third implementation of the imaging device in the embodiments of the present application is applied to glasses.

FIG. 9 is a schematic diagram of a specific example where the third implementation of the device of the present application is applied to glasses, and the glasses adopt an eye focusing point detection system 900 to realize the function of the focusing point detection module in the acquisition subunit.

A micro camera 910 which functions the same as the image collection device in FIG. 8b, is arranged at the outer right side of the glasses in order not to affect the line-of-sight of a user viewing an object normally;

a first beam splitter 920 which functions the same as the first beam splitting unit 8221 in FIG. 8b, is arranged with a certain tilt angle at the intersection point of the gazing direction of an eye and the incident direction of the camera 910, and transmits the light entering the eye 300 from a gazed object and reflects the light from the eye 300 to the camera 910; and a lens with adjustable focal length 930 which functions the same as the lens with adjustable focal length in FIG. 8b, is located between the first beam splitter 920 and the camera 910, and adjusts the focal length value in real time, so that the camera 910 can photograph images with a definition greater than the predetermined value at the eye fundus at a certain focal length value.

In this implementation, the image processing device is not shown in FIG. 9, and functions the same as the image processing device as shown in FIG. 8b.

Since the brightness of the eye fundus is not enough under normal circumstances, the eye fundus is preferably illuminated, and in this implementation, the eye fundus is illuminated by a light emitting source 940. In order not to affect the user experience, the light emitting source 940 herein can be a near-infrared light emitting source which does not significantly affect the eye 300 and to which the camera 910 is relatively sensitive.

In this implementation, the light emitting source 940 is located on the outer right side of a glass frame, therefore it needs a second beam splitter 950 together with the first beam splitter 920 to complete the transferring of the light emitted by the light emitting source 940 to the eye fundus. In this implementation, the second beam splitter 950 is also located in front of the incident surface of the camera 910, therefore it needs to transmit the light from the eye fundus to the second beam splitter 950.

It can be seen that in this implementation, in order to enhance the user experience and enhance the collection definition of the camera 910, the first beam splitter 920 can have the characteristics of high reflectivity to infrared and high transmissivity to visible light. For example, an infrared reflective film can be arranged on the side of the first beam splitter 920 facing the eye 300 to realize the characteristics described above.

It can be seen from FIG. 9 that, since in this implementation, the eye focusing point detection system 900 is located on the side of the lens of the glasses facing away from the eye 300, the lens can be considered as a part of the glasses during the calculation of the optical parameters of the eye, without the need of knowing the optical characteristics of the lens.

In other implementations of the embodiments of the present application, the eye focusing point detection system 900 may be located on the side of the lens of the glasses close to the eye 300, and then, it needs to obtain the optical characteristic parameters of the lens in advance and take the affecting factor of the lens into account when the focusing point distance is calculated.

The light emitted by the light emitting source 940 is reflected by the second beam splitter 950, projected by the lens with adjustable focal length 930 and reflected by the first beam splitter 920, then transmits through the lens of the glasses to enter the eye of the user, and finally arrives at the retina of the eye fundus; and the camera 910 photographs an image at the eye fundus through the pupil of the eye 200 via an optical path composed of the first beam splitter 920, the lens with adjustable focal length 930 and the second beam splitter 950.

In order to reduce the weight of the glasses and improve the portability thereof, in the object determination unit 210 of the device of the present application, the function of the image collection subunit 211 is realized using the micro camera 910, and the function of the first beam splitting plate 212 is realized using the first beam splitter 920. In FIG. 9, the image analysis subunit 213 and factor subunit 722 are arranged independently configured to analyze the collected images at the eye fundus and determining a corresponding zooming-in factor according to the observation distance, respectively. The image analysis subunit 213, factor subunit 722 and image processing device can also be integrated into a processor for realization.

In addition, the execution subunit 723 comprises a first lens 723a close to the side of the eye and a second lens 723b close to the side of the gazed object, and at least one lens in the first lens 723a and second lens 723b has adjustable imaging parameters, so as to realize the change in the size of the target image according to the zooming-in factor; and the specific realization principle is not described redundantly.

Figure 10A:
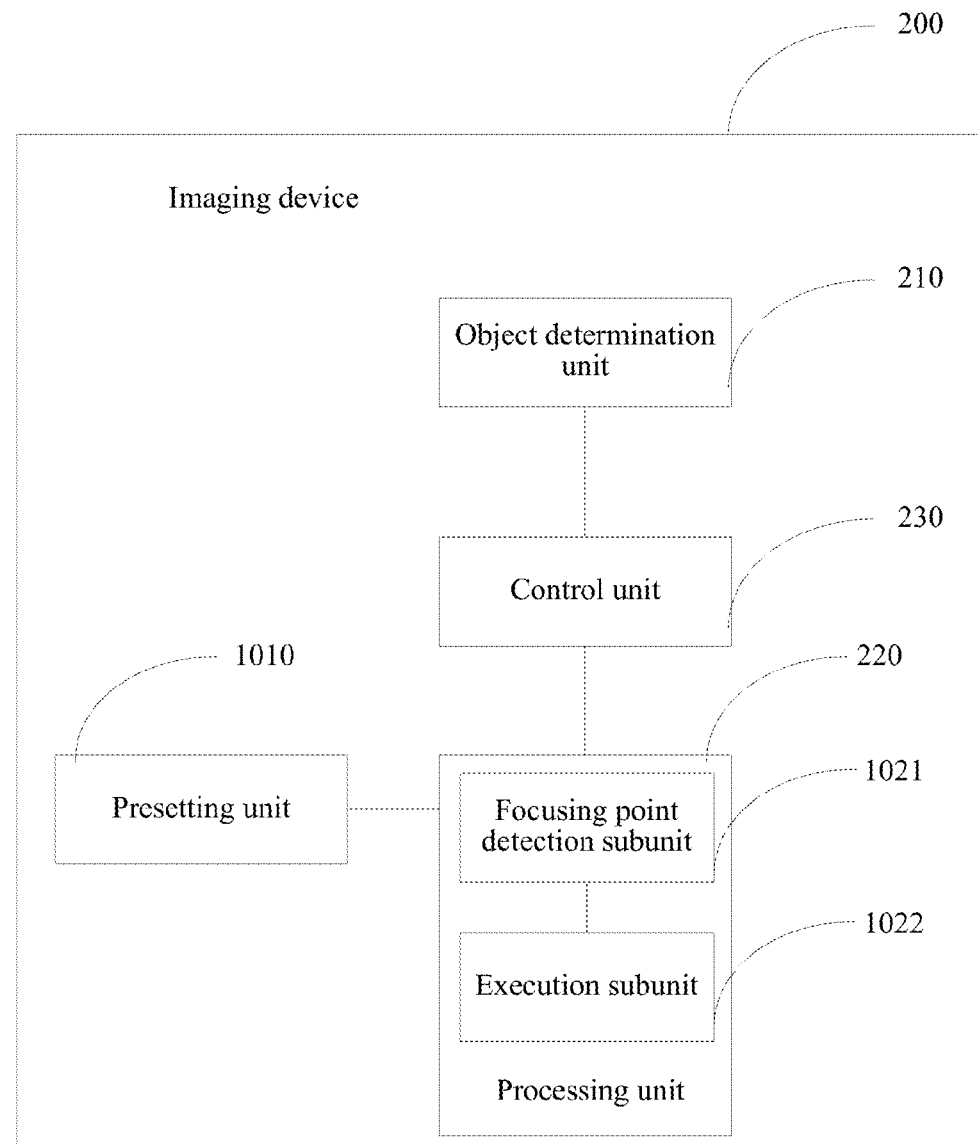
FIG. 10a is an example schematic diagram of a module structure of a fourth implementation of the imaging device in the embodiments of the present application.

As shown in FIG. 10a, in the fourth implementation of the imaging device of the present application, the device 200 also comprises: a presetting unit 1010.

The presetting unit 1010 is configured to preset a target focusing point distance of an eye of a user, and a buffer zone of the target focusing point distance. The target focusing point distance and the buffer zone can be set when the device 200 leaves the factory, and can also be set by the user according to personal preferences. The setting specifically can be done by keys, a touch screen, sound control and the like.

Correspondingly, the processing unit 220 comprises: a focusing point detection subunit 1021 and an execution subunit 1022.

The focusing point detection subunit 1021 is configured to detect the actual focusing point distance of the eye of the user.

Figure 10B:
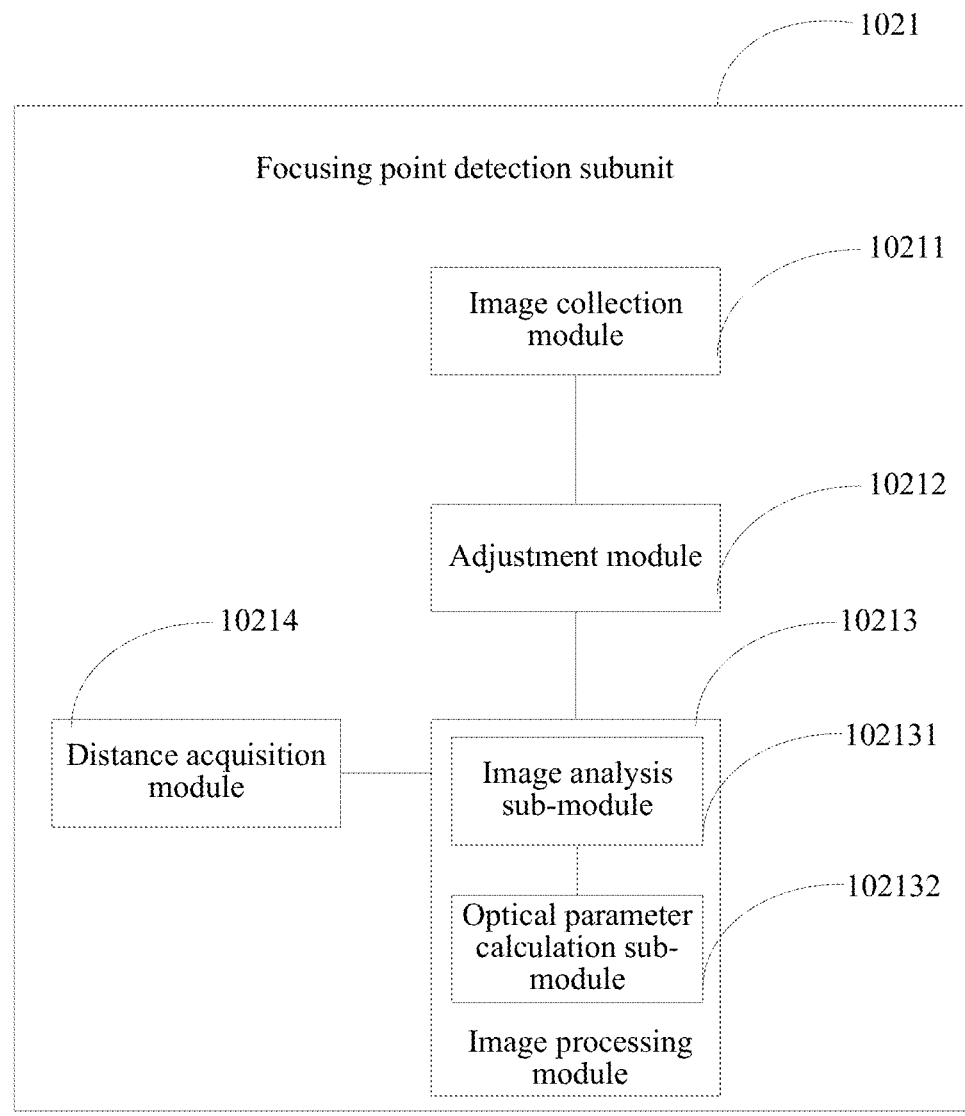
FIG. 10b is an example schematic diagram of a module structure of the focusing point detection subunit in the embodiments of the present application.

As shown in FIG. 10b, the focusing point detection subunit 1021 comprises: an image collection module 10211, an adjustment module 10212, an image processing module 10213 and a distance acquisition module 10214.

The image collection module 10211 is configured to collect images presented at the user's eye fundus;

the adjustment module 10212 is configured to adjust the imaging parameters of the optical path between the eye and the image collection module 10211, to collect images with a definition greater than a predetermined value; and the image processing module 10213 is configured to process the collected images, to obtain optical parameters of the eye corresponding to the images with a definition greater than the predetermined value. The image processing module 10213 comprises: an image analysis sub-module 102131 configured to analyze the collected images to find out images with a definition greater than the predetermined value; and an optical parameter calculation sub-module 102132 configured to calculate the optical parameters of the eye according to the images with a definition greater than the predetermined value and the known imaging parameters of the optical path corresponding to the images with a definition greater than the predetermined value.

The distance acquisition module 10214 is configured to obtain the actual focusing point distance of the eye according to the optical parameters of the eye.

It can be seen that the focusing point detection subunit 1021 can also be realized using the eye focusing point detection system in the previous implementation, and the specific realization details thereof are not described redundantly.

The execution subunit 1022 is configured to change the size of the target image according to the target focusing point distance, the actual focusing point distance, and the buffer zone.

In particular, the execution subunit 1022 is configured to increase the actual focusing point distance to the target focusing point distance, in the case where the actual focusing point distance is smaller than the target focusing point distance and the actual focusing point distance is outside the buffer zone, so as to zoom-out the target image, and decreasing the actual focusing point distance to the target focusing point distance, in the case where the actual focusing point distance is greater than the target focusing point distance and the actual focusing point distance is outside the buffer zone, so as to zoom-in the target image. In addition, in some product applications, the buffer zone may be absent, that is, the buffer zone is set to zero, whereby the execution subunit 1022 is configured to increase the actual focusing point distance to the target focusing point distance, in the case where the actual focusing point distance is smaller than the target focusing point distance, so as to zoom-out the target image, and decreasing the actual focusing point distance to the target focusing point distance, in the case where the actual focusing point distance is greater than the target focusing point distance, so as to zoom-in the target image.

Figure 10C:
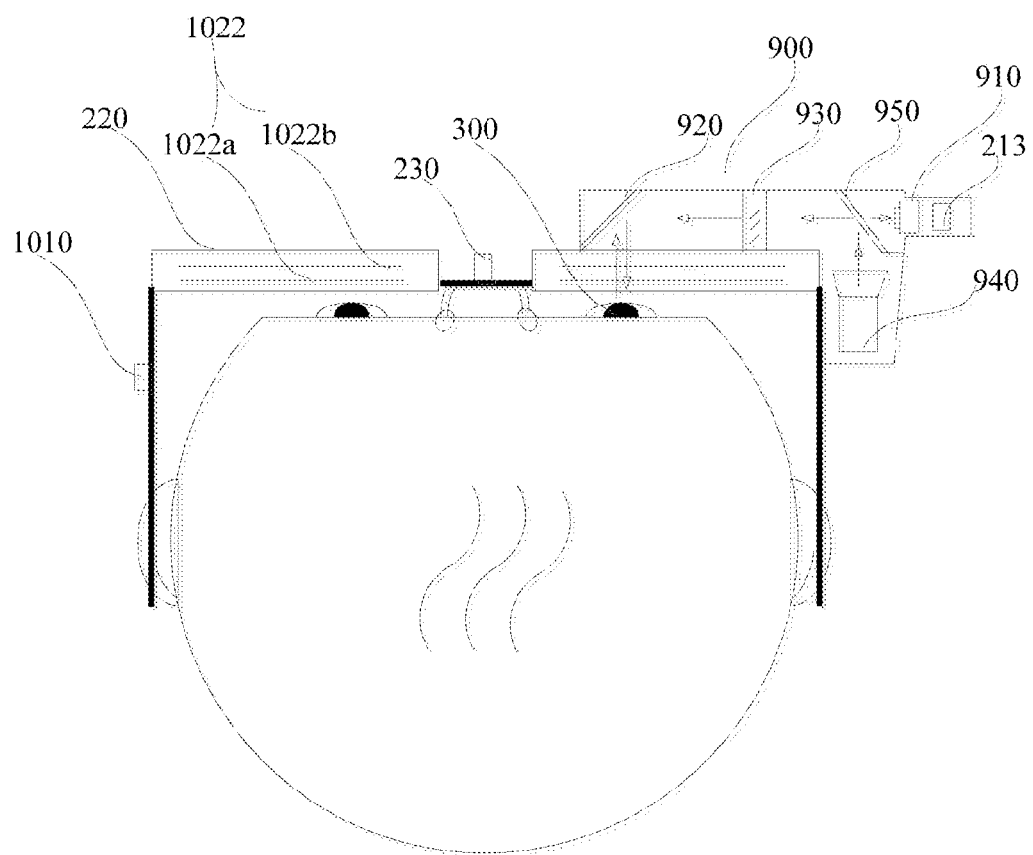
FIG. 10c is an example schematic diagram of a specific example where the fourth implementation of the imaging device in the embodiments of the present application is applied to glasses.

FIG. 10c is a schematic diagram of a specific example where the fourth implementation of the device of the present application is applied to glasses.

As shown in FIG. 10c, the eye of this implementation also adopts the eye focusing point detection system 900, and the realization for the eye focusing point detection system 900 is not described redundantly.

In addition, the presetting unit 1010 can be provided on the frame of glasses, and can receive setting information by keys, a touch screen, sound control and other means.

The control unit 230 is arranged at a position between the two lenses, and configured to activate the processing unit 220 in the case where the user has observed the gazed object for a time period exceeding a predetermined time.

The execution subunit 1022 comprises a lens set composed of at least two lenses, and at least one lens in the at least two lenses has adjustable imaging parameters. For simplicity, the execution subunit 1022 in FIG. 10c comprises a first lens 1022a close to the side of the eye and a second lens 1022b close to the side of the gazed object, and at least one lens in the first lens 1022a and second lens 1022b has adjustable imaging parameters, so as to change the size of the target image; and the specific realization principle is not described redundantly.

Figure 11:
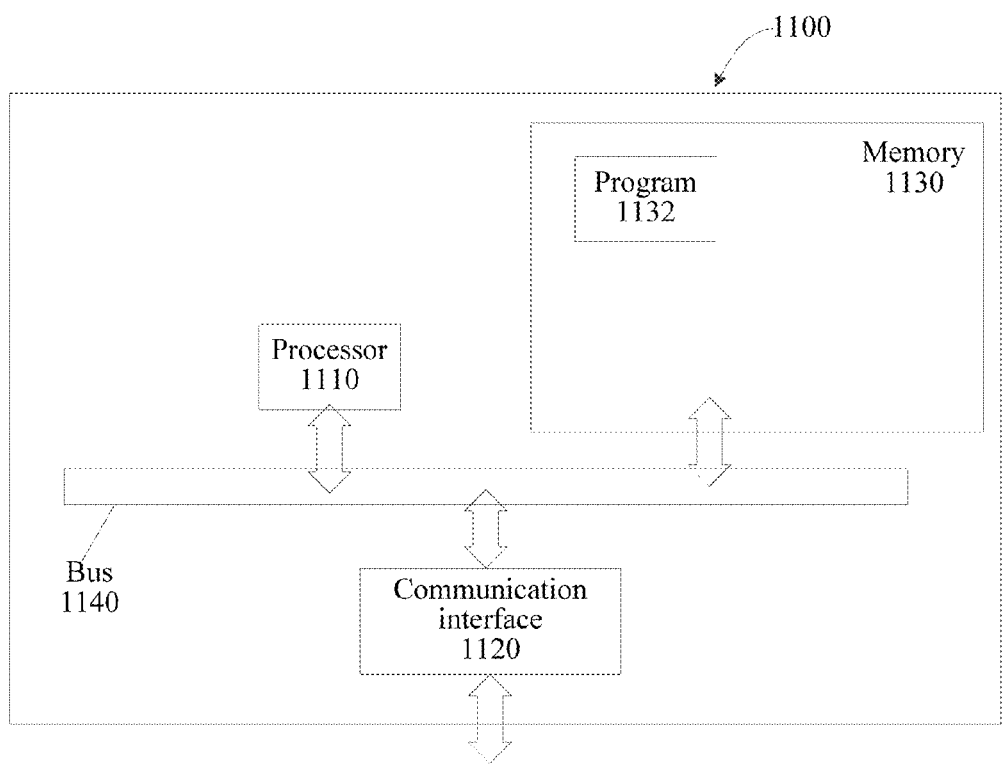
FIG. 11 is an example structural diagram of the imaging device in the embodiments of the present application.

The structure of the imaging device in the embodiments of the present invention is as shown in FIG. 11. The specific embodiment of the present invention does not impose any limitation on the specific realization of the imaging device; as shown in FIG. 11, the imaging device 1100 can comprise:

a processor 1110, a communications interface 1120, a memory 1130 and a communication bus 1140. In this case:

the processor 1110, the communications interface 1120 and the memory 1130 complete mutual communications via the communication bus 1140.

The communications interface 1120 is configured to communicate with other network elements.

The processor 1110 is configured to execute a program 1132, and in particular, can execute the related steps in the embodiment of the method shown in FIG. 1 above.

In particular, the program 1132 can include program codes, the program codes including computer operation instructions.

The processor 1110 may be a central processing unit CPU, or a specific integrated circuit ASIC (Application Specific Integrated Circuit), or be configured to be one or more integrated circuits which implement the embodiments of the present invention.

The memory 1130 is configured to store the program 1132.

The memory 1130 may contain a high-speed RAM memory, and may also contain a non-volatile memory, such as at least one magnetic disc storage. The program 1132 particularly can execute the following steps:

determining a gazed object of a user according to an image at the user's eye fundus; and changing the size of the target image of the gazed object at the user's eye fundus according to a predetermined zooming rule.

The particular realization of each step in the program 1132 can refer to the corresponding step or module in the above-mentioned embodiments, and is not described here redundantly. It could be clearly known by those skilled in the art that the particular working procedures of the apparatuses and modules described above can refer to the description of corresponding procedures in the preceding embodiments of the method, and are not described here redundantly in order to making the description convenient and concise. In conclusion, the imaging device in this embodiment determines a gazed object of a user according to an image at the user's eye fundus, and automatically changes the size of the target image of the gazed object at the user's eye fundus through optical zoom processing, according to the size of the target image of the gazed object at the user's eye fundus, or according to an observation distance from the gazed object to an eye of the user, so that the user feels that the gazed object is observed with an appropriate size of the image at the eye fundus at an appropriate distance, thereby facilitating a user to observe a gazed object.

It can be appreciated by those skilled in the art that each exemplary unit and method step described with reference to the embodiments disclosed in this text can be realized by electronic hardware or a combination of computer software and electronic hardware. Whether these functions are executed in a hardware mode or a software mode depends on the specific applications and design constraint conditions of the technical solution. The professional technicians can use different methods to realized the functions described with respect to each specific application, but this realization should not be considered as beyond the scope of the present application.

If the function is realized in the form of a software functional unit and is sold or used as an independent product, it can be stored in a computer readable storage medium. Based on such understanding, the technical solution of the present application essentially or the part which contributes to the prior art or a part of the technical solution can be embodied in the form of a software product, and the computer software product is stored in a storage medium and includes several instructions configured to enable a computer apparatus (which can be a personal computer, a server, or a network apparatus, etc.) to execute all or some steps of the method described in each embodiment of the present application. The preceding storage medium includes various media which can store program codes, such as a USB disk, a mobile hard disk, a read-only memory (ROM), a random access memory (RAM), a magnetic disc or a compact disc, etc.

The above implementations are only used to describe the present application, without limiting the present application; various alterations and variants can be made by those skilled in the art without departing from the spirit and scope of the present application; therefore all equivalent technical solutions also belong to the scope of the present application; and the scope of patent protection of the present application should be defined by claims.

The invention claimed is:

1. A method, comprising:
    determining, by a system comprising a processor, a gazed object of a user according to an image at an eye fundus of the user; and
    changing a size of a target image of the gazed object at the eye fundus according to a predetermined zooming rule.

2. The method of claim 1, wherein the changing the size of the target image includes:
    in a case where the user has observed the gazed object for a time period exceeding a predetermined time, changing the size of the target image of the gazed object at the eye fundus according to the predetermined zooming rule.

3. The method of claim 1, wherein the method also includes:
    presetting a target area ratio of the target image, and a buffer zone of the target area ratio,
    and the changing the size of the target image includes:
    determining an actual area ratio of the target image at the eye fundus; and
    changing the size of the target image according to the target area ratio, the actual area ratio, and the buffer zone.

4. The method of claim 3, wherein the changing the size of the target image according to the target area ratio, the actual area ratio, and the buffer zone includes:
    in the case where the actual area ratio is smaller than the target area ratio and the actual area ratio is outside the buffer zone, zooming-in the target image to the target area ratio.

5. The method of claim 3, wherein the changing the size of the target image according to the target area ratio, the actual area ratio, and the buffer zone includes:
    in the case where the actual area ratio is greater than the target area ratio and the actual area ratio is outside the buffer zone, zooming-out the target image to the target area ratio.

6. The method of claim 3, wherein the buffer zone is zero.

7. The method of claim 1, wherein the changing the size of the target image includes:
    determining the actual area ratio of the target image at the eye fundus;
    determining a corresponding zooming-in factor according to the actual area ratio; and
    changing the size of the target image according to the zooming-in factor.

8. The method of claim 1, wherein the changing the size of the target image includes:
    acquiring an observation distance from the gazed object to an eye of the user;
    determining a corresponding zooming-in factor according to the observation distance; and
    changing the size of the target image according to the zooming-in factor.

9. The method of claim 8, wherein the acquiring the observation distance includes:
    detecting an actual focusing point distance of the eye of the user, and taking the actual focusing point distance as the observation distance from the gazed object to the eye of the user.

10. The method of claim 8, wherein the acquiring the observation distance includes:
    tracking a direction of line-of-sight of the eye of the user, acquiring the scene depth of the position where the gazed object is located according to the direction of line-of-sight, and determining the observation distance from the gazed object to the eye of the user according to the scene depth.

11. The method of claim 8, wherein the acquiring the observation distance includes:
    tracking directions of line-of-sight of both eyes of the user, and obtaining the observation distance from the gazed object to the eye of the user via an intersection point of the directions of line-of-sight of both eyes of the user.

12. The method of claim 1, further comprising:
    presetting a target focusing point distance of the eye of the user, and a buffer zone of the target focusing point distance, wherein the changing the size of the target image includes:
    detecting an actual focusing point distance of the eye of the user; and
    changing the size of the target image according to the target focusing point distance, the actual focusing point distance, and the buffer zone.

13. The method of claim 12, wherein the changing the size of the target image according to the target focusing point distance, the actual focusing point distance, and the buffer zone includes:
    in the case where the actual focusing point distance is smaller than the target focusing point distance and the actual focusing point distance is outside the buffer zone, increasing the actual focusing point distance to the target focusing point distance.

14. The method of claim 12, wherein the changing the size of the target image according to the target focusing point distance, the actual focusing point distance, and the buffer zone includes:
    in the case where the actual focusing point distance is greater than the target focusing point distance and the actual focusing point distance is outside the buffer zone, decreasing the actual focusing point distance to the target focusing point distance.

15. The method of claim 12, wherein the buffer zone is zero.

16. The method of claim 9, wherein the detecting the actual focusing point distance of the eye of the user includes:
collecting images presented at the eye fundus of the user;
adjusting an imaging parameter of the optical path between the eye and the collection position, to collect a set of images with a definition greater than a predetermined value;
processing the images to obtain an optical parameter of the eye corresponding to the set of images with the definition greater than the predetermined value; and
obtaining the actual focusing point distance of the eye according to the optical parameter of the eye.

17. The method of claim 16, wherein the processing the images to obtain the optical parameter includes:
analyzing the images to find the set of images; and
determining the optical parameter of the eye according to the set of images and the imaging parameter of the optical path corresponding to the set of images.

18. The method of claim 1, wherein the changing the size of the target image includes:
changing the size of the target image of the gazed object at the eye fundus by optical zoom processing.

19. An imaging device, comprising:
a processor that executes or facilitates execution of executable units to perform operations of the imaging device, the executable units comprising:
an object determination unit configured to determine a gazed object of a user according to an image at an eye fundus of the user; and
a processing unit configured to change a size of a target image of the gazed object at the eye fundus according to a predetermined zooming rule.

20. The imaging device of claim 19, wherein the executable units further comprise:
a control unit configured to activate the processing unit in a case where the user has observed the gazed object for a time period exceeding a predetermined time.

21. The imaging device of claim 19, wherein the executable units further comprise:
a presetting unit configured to preset a target area ratio of the target image, and a buffer zone of the target area ratio, wherein the processing unit comprises:
a calculation subunit configured to calculate an actual area ratio of the target image at the eye fundus; and
an execution subunit configured to change the size of the target image according to the target area ratio, the actual area ratio, and the buffer zone.

22. The imaging device of claim 19, wherein the processing unit comprises:
a calculation subunit configured to calculate an actual area ratio of the target image at the eye fundus;
a factor subunit configured to determine a corresponding zooming-in factor according to the actual area ratio; and
an execution subunit configured to change the size of the target image according to the zooming-in factor.

23. The imaging device of claim 19, wherein the processing unit comprises:
an acquisition subunit configured to acquire an observation distance from the gazed object to an eye of the user;
a factor subunit configured to determine a corresponding zooming-in factor according to the observation distance; and
an execution subunit configured to change the size of the target image according to the zooming-in factor.

24. The imaging device of claim 23, wherein the acquisition subunit comprises:
a focusing point detection module configured to detect an actual focusing point distance of the eye of the user, and taking the actual focusing point distance as the observation distance from the gazed object to the eye of the user.

25. The imaging device of claim 23, wherein the acquisition subunit comprises:
an optical axis tracking module configured to track a direction of line-of-sight of the eye of the user;
a depth acquisition module configured to acquire the scene depth of the position where the gazed object is located according to the direction of line-of-sight; and
a calculation module configured to calculate according to the scene depth to obtain the observation distance from the gazed object to the eye of the user.

26. The imaging device of claim 23, wherein the acquisition subunit comprises:
an optical axis tracking module configured to track directions of line-of-sight of both eyes of the user; and
a distance acquisition module configured to acquire the observation distance from the gazed object to the eye of the user based on an intersection point of the directions of line-of-sight of both eyes of the user.

27. The imaging device of claim 19, wherein the executable units further comprise:
a presetting unit configured to preset a target focusing point distance of an eye of the user, and a buffer zone of the target focusing point distance, wherein the processing unit comprises:
a focusing point detection subunit configured to detect the actual focusing point distance of the eye of the user; and
an execution subunit configured to change the size of the target image according to the target focusing point distance, the actual focusing point distance, and the buffer zone.

28. The imaging device of claim 27, wherein the focusing point detection subunit comprises:
an image collection module configured to collect images presented at the eye fundus;
an adjustment module configured to adjust an imaging parameter of the optical path between the eye and the image collection module, to collect a set of images with a definition greater than a predetermined value;
an image processing module configured to process the images to obtain an optical parameter of the eye corresponding to the set of images with the definition greater than the predetermined value; and
a distance acquisition module configured to obtain the actual focusing point distance of the eye according to the optical parameter of the eye.

29. The imaging device of claim 28, wherein the image processing module comprises:
an image analysis sub-module configured to analyze the images to find the set of images; and
an optical parameter calculation sub-module configured to determine the optical parameters of the eye, according to the set of images and the imaging parameter of the optical path corresponding to the set of images.

30. The imaging device of claim 19, wherein the device is, a pair of glasses.

31. A computer readable storage device, comprising at least one executable instruction, which, in response to execution, causes an imaging device comprising a processor to perform operations, comprising:

determining a gazed object of a user according to an image at an eye fundus of the user; and changing a size of a target image of the gazed object at the eye fundus according to a predefined zooming rule.

32. An imaging device, comprising a processor and a memory, the memory storing computer executable instructions, the processor being connected to the memory through a communication bus, and when the imaging device operates, the processor executing the computer executable instructions stored in the memory, so that the imaging device executes operations, comprising:

determining a gazed object of a user according to an image at an eye fundus of the user; and changing a size of a target image of the gazed object at the eye fundus according to a defined zooming rule.

* * * * *